(12) United States Patent
Barnes et al.

(10) Patent No.: US 12,479,008 B2
(45) Date of Patent: Nov. 25, 2025

(54) VIBRATORY SCREENS

(71) Applicant: MIS.CARBONART PTY LTD, Osborne Park (AU)

(72) Inventors: Philip Barnes, Osborne Park (AU); Carsten Weckend, Osborne Park (AU); Alex Vincan, Osborne Park (AU); David De Haas, Osborne Park (AU)

(73) Assignee: MIS.CARBONART PTY LTD, Osborne Park (AU)

( * ) Notice: Subject to any disclaimer, the term of this patent is extended or adjusted under 35 U.S.C. 154(b) by 4 days.

(21) Appl. No.: 18/683,915

(22) PCT Filed: Aug. 18, 2022

(86) PCT No.: PCT/AU2022/050919
§ 371 (c)(1),
(2) Date: Feb. 15, 2024

(87) PCT Pub. No.: WO2023/019316
PCT Pub. Date: Feb. 23, 2023

(65) Prior Publication Data
US 2025/0135496 A1  May 1, 2025

(30) Foreign Application Priority Data

Aug. 18, 2021 (AU) ................................ 2021902579
Aug. 18, 2021 (AU) ................................ 2021902580

(51) Int. Cl.
*B07B 1/46* (2006.01)
*B07B 1/28* (2006.01)
(Continued)

(52) U.S. Cl.
CPC ................ *B07B 1/46* (2013.01); *B07B 1/28* (2013.01); *B32B 3/04* (2013.01); *B32B 3/30* (2013.01);
(Continued)

(58) Field of Classification Search
CPC .... B07B 1/46; B07B 1/28; B32B 3/04; B32B 3/30; B32B 5/02; B32B 5/18; B32B 5/245; B32B 2262/106
See application file for complete search history.

(56) References Cited

U.S. PATENT DOCUMENTS

| 4,288,320 | A | * | 9/1981 | Wilson | ...................... | B07B 1/54 |
| | | | | | | 209/403 |
| 2010/0282649 | A1 | * | 11/2010 | Angus | ...................... | B07B 1/42 |
| | | | | | | 403/345 |
| 2021/0284318 | A1 | * | 9/2021 | Joseph | ...................... | B64F 5/10 |

FOREIGN PATENT DOCUMENTS

| CL | 202400488 | 6/2024 |
| CL | 202400490 | 6/2024 |

(Continued)

*Primary Examiner* — Jacob S. Scott
*Assistant Examiner* — Miraj T. Patel
(74) *Attorney, Agent, or Firm* — Greer, Burns & Crain, Ltd.

(57) ABSTRACT

The invention provides a vibratory screen (100) with several improvements. A side panel (160) comprises an outer carbon fibre layer (1720), an inner carbon fibre layer (1710) and a foam layer (130) between the inner and outer carbon fibre layers. A support beam (140) comprises an inner core (1420) having at least one carbon fibre layer and an outer polymeric shell (1425) formed on the at least one carbon fibre layer. A protective cover (1800) for the support beam (140) comprises a cover body (1810) and one or more deflecting elements (1820) for deflecting material away from the support beam. Other improvements include a protective plate (200) for the side panels (160) and a driver member assembly (130) having drive beams (400) with an opening (480) to relieve stress.

19 Claims, 20 Drawing Sheets

(51) Int. Cl.
 *B32B 3/04* (2006.01)
 *B32B 3/30* (2006.01)
 *B32B 5/02* (2006.01)
 *B32B 5/18* (2006.01)
 *B32B 5/24* (2006.01)

(52) U.S. Cl.
 CPC ............... *B32B 5/02* (2013.01); *B32B 5/18* (2013.01); *B32B 5/245* (2013.01); *B32B 2262/106* (2013.01)

(56) References Cited

FOREIGN PATENT DOCUMENTS

| | | |
|---|---|---|
| CN | 207374396 U | 5/2018 |
| CN | 214563437 U | 11/2021 |
| GB | 1520885 A | 8/1978 |
| GB | 2208273 A | 3/1989 |
| JP | H06123158 A | 5/1994 |
| KR | 101247556 B1 | 3/2013 |
| WO | WO2023019315 A1 | 2/2023 |

\* cited by examiner

VIBRATORY SCREENS

CROSS-REFERENCE TO RELATED APPLICATIONS

This application is the U.S. National phase application corresponding to PCT/AU2022/050919 which was assigned an international filing date of Aug. 18, 2022 and associated with publication WO 2023/019316 and which claims priority to Australian Application No. AU2021902579, filed Aug. 18, 2021, and Australian Application No. AU2021902580, filed Aug. 18, 2021 the disclosures of which are expressly incorporated herein by reference.

FIELD OF THE INVENTION

The invention relates to improvements to a vibratory screen and in particular to improvements in several components of a vibratory screen, especially a support beam for a vibratory screen. The invention has been developed primarily for use in a vibratory screen applied to the separation of mineral ore and will be described hereinafter by reference to this application. However, it will be appreciated that various aspects of the invention are capable of other applications, such as the protection of screening apparatus used in separating corrosive or crushable materials or suspensions, or any construction or structure requiring support elements or beams resistant to stress and corrosion.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Vibratory screens are frequently used in the mining and mineral processing industries for separating ores of different particle sizes. Vibratory screens can be used in variety of applications. For example, in the separation of dry particles, such as iron ore. In another example, vibratory screens are used in the separation of wet particles from dry particles, such as that used in spodumene separation (spodumene being the hard rock precursor to lithium hydroxide or lithium carbonate).

A typical vibratory screen comprises a frame mounted on springs with a screen or deck fitted to the frame and a drive mechanism to induce vibrations in the frame (and hence, the screen). Generally, vibratory screens are either designated as inclined or horizontal, referring to the type of motion used. A horizontal vibratory screen uses a reciprocating or back and forth motion to induce vibrations, whereas an inclined vibratory screen uses a circular motion to induce vibrations. The drive mechanism has a motor operably connected to one or more drive members, beams or shafts mounted to the frame. The motor induces movement to the drive beam(s), which is transmitted to the frame and generates vibrations. The drive beam(s) may have eccentric weights to assist in generating vibrations. In operation, mineral ore having a variety of particle sizes is loaded onto the screen or deck. Vibrations are generated by the drive mechanism and transmitted to the frame and screen, causing the ore particles to be classified according to the size of the holes in the screen.

The main deficiencies in current vibratory screens revolve around longevity, especially when the vibratory screen is used as solid separation screens in a liquid separation/dewatering process, which has an increased tendency to create pitting and corrosion. Conventional vibratory screens are made entirely of a mixture of steel, stainless steel and polyurethane, depending on the component. As such, conventional vibratory screens tend to break easily, be damaged by impact strikes from moving ore particles, corrode, bend, rust or otherwise degrade, especially when the ore material is corrosive and/or abrasive or the liquid operating environment promotes corrosion or rust in the vibratory screen components. For example, corrosion or fatigue in the cross beams that support the screen deck weakens their flexibility and resistance to the impact strikes from ore particles and vibrations, thus weakening the entire vibratory screen. This results in conventional vibratory screens requiring frequent refurbishment or replacement. For example, refurbishment may be required every 6 to 8 months when used in a dewatering/wet process. Refurbishment typically costs around AUD 100,000. Hence, the need for constant refurbishment due to corrosion and fatigue imposes a significant capital, operational and maintenance burden.

It is an object of the present invention to overcome or substantially ameliorate one or more of the disadvantages of prior art, or at least to provide a useful alternative. It is an object of the invention in at least one preferred form to provide an improved or useful vibratory screen having greater longevity by reducing corrosion and/or fatigue in its components. It is also an object of the invention in at least one preferred form to provide an improved or useful structural component for a vibratory screen having greater longevity by reducing corrosion and/or fatigue in its support beams

SUMMARY OF THE INVENTION

A first aspect of the invention provides a protective cover for a support beam, comprising a cover body and one or more deflecting elements for deflecting material away from the support beam.

In some embodiments, the one or more deflecting elements are configured to deflect the material, which may be in the form of mineral particles and/or liquids. In other embodiments, the deflecting elements comprise deflecting surfaces to deflect the mineral particles and/or liquids away from the support beam. In further embodiments, the deflecting surfaces are substantially inclined relative to the support beam. In additional embodiments, the one or more deflecting surfaces are formed on one or more inclined sides of the cover body. In one embodiment, the deflecting elements are provided on an outer side of the cover body.

In some embodiments, the deflecting surfaces may have one or more screening surfaces for separating solid particles from the liquids. In other embodiments, the screening surfaces comprise one or more apertures. In further embodiments, the screening surfaces comprise a mesh.

In some embodiments, the cover body comprises a hollow interior. In other embodiments, the cover body comprises at least one inclined side. In further embodiments, the cover body comprises two sides connected along one edge. In one embodiment, the one or more deflecting elements are formed on the at least one inclined side or at least one of the two sides.

In some embodiments, the cover body comprises one or more top portions, preferably connected to each of the two sides. In other embodiments, the top portions are substantially flat. In further embodiments, the top portions are disposed at intervals along the length of the cover body. In one embodiment, at least one protrusion extends between adjacent top portions to guide mineral particles and/or liquids to the deflecting elements. In yet other embodiments, the at least one protrusion comprises a ridge or fin. In further embodiments, there is a plurality of ridges or fins.

In other embodiments, there are two inclined sides that are joined to form an apex extending along the length of the cover body. In further embodiments, the protrusion is formed on the apex.

In another embodiment, the cover body is substantially triangular, triangular prismatic or V-shaped, with inclined sides forming the deflecting elements or surfaces. In a further embodiment, the cover body is substantially U-shaped or curved, with opposed sides forming the deflecting elements or surfaces. In some embodiments, the cover body has a shape configured to redirect or divert the mineral particles and/or liquid away from the support beam.

In some embodiments, the cover body comprises a skirt portion along at least one edge for engaging the support beam. In other embodiments, the skirt portion is formed at the edge of the at least one inclined side or at least one of the two sides.

In some embodiments, the protective cover comprises a recessed portion to reduce the profile of the protective cover. In further embodiments, the recessed portion is formed in at least one side of the cover body. In other embodiments, the recessed portion is formed on each side of the cover body.

In some embodiments, the protective cover comprises at least one reinforcement element. In other embodiments, the reinforcement element is provided on an inner side or surface of the cover body. In further embodiments where the protective cover comprises a hollow interior, the reinforcement element is disposed between opposed inner sides of the cover body. In one embodiment, the reinforcement element comprises a web, plate or flange for connecting the opposed inner sides. In yet other embodiments, there is a plurality of the reinforcement elements.

In some embodiments, the cover body is divided into sub-components, each sub-component being connectable with each other to form the protective cover. In other embodiments, the sub-components each have one or more inter-engaging elements to connect to another sub-component. In further embodiments, the inter-engaging elements comprise complementary connecting surfaces that overlap each other.

A second aspect of the invention provides a support beam for a vibratory screen comprising the protective cover of the first aspect. In some embodiments, the support beam comprises a beam body, wherein the protective cover is mounted to the beam body. In other embodiments, the support beam comprises a beam body, wherein the protective cover comprises a protective cover portion integrally formed with the beam body.

In some embodiments, the second aspect may also have the features of the embodiments of the first aspect, as described above.

A third aspect of the invention provides a support beam for a vibratory screen comprising:
an inner core having at least one carbon fibre layer; and
an outer polymeric shell formed on the at least one carbon fibre layer.

In some embodiments, the inner core comprises multiple carbon fibre layers bonded together. In another embodiment, the inner core comprises a plurality of layered carbon fibre sheets. In other embodiments, the carbon fibre layers are bonded together by an adhesive. In further embodiments, the adhesive is an acrylic adhesive. In one particular embodiment, the adhesive is a methacrylate adhesive. In yet other embodiments, other adhesives may be used such as cyanoacrylate adhesives, epoxy adhesives and the like.

In some embodiments, the inner core comprises a substantially hollow member. In other embodiments, the inner core comprises a solid member. In further embodiments, the inner core may have a honeycomb, rigid, semi-rigid or other type of structure. In additional embodiments, the inner core may have a cross-section that is a circular, oval, hexagonal, octagonal, rectangular, square, pentagonal, decagonal, dodecagonal or any other polygonal shape or combination of such shapes.

In some embodiments, the inner core may be composed only of the carbon fibre layers. Alternatively, the inner core may be composed of other materials, such as steel, stainless steel, foam, plastics including polyurethane (PE), polytetrafluoroethylene (PTFE) or polypropylene (PP), resin, ceramic and the like. Similarly, the inner core may be composed of a composite material or combination of two or more of the above materials.

In some embodiments, one or more interconnecting elements are mounted to the support beam for interconnecting the support beam to one or more rails. In other embodiments, the one or more interconnecting elements are mounted to the inner core. In further embodiments, the one or more interconnecting elements are mounted to the outer polymeric shell.

In some embodiments, the one of more interconnecting elements are configured to interconnect the support beam to the one or more rails. In other embodiments, the interconnecting elements comprise an interconnecting flange mountable to the support beam along one edge and connectable to the one or more rails. In one embodiment, the interconnecting flange comprising a mounting portion for mounting to the support beam and a connecting portion extending from the mounting portion. In further embodiments, the one or more rails are connected to one side or face of the connecting portion, preferably by fasteners.

In additional embodiments, the interconnecting elements may be integrally formed with the support beam, either the inner core or the polymeric outer shell. In yet other embodiments, the mounting portions is integrally formed with the support beam and the connecting portion is fitted or attached to the mounting portion.

In further embodiments, at least one portion of the interconnecting elements have a shape complementary to the shape of the at least one support beam. In one embodiment, the at least one support beam has an outwardly curved shape and the at least one interconnecting element portion has a corresponding inwardly curved shape. In another embodiment where the interconnecting element comprises the interconnecting flange, the mounting portion has the corresponding inwardly curved shape.

In some embodiments, the support beam comprises a protective cover for deflecting material away from the support beam. In other embodiments, the protective cover is configured to deflect mineral ore particles. In further embodiments, the protective cover is in accordance with the protective cover of the first aspect and its embodiments. In yet other embodiments, the support beam is in accordance with the second aspect and its embodiments.

A fourth aspect of the invention provides a vibratory screen comprising:
a frame;
at least one screen deck connected to the frame; and one or more support beams connected to the frame for supporting the screen deck, wherein the one or more support beams are in accordance with the second or third aspects.

In some embodiments, the at least one screen deck comprises a screen surface and one or more rails supporting the screen surface, wherein the protective cover receives the one or more rails. In additional embodiments, the protective cover supports the one or more rails. In other embodiments, the protective cover comprises openings to receive the one of more rails. In further embodiments, the openings in the protective cover comprise slots. The slots may be open at one end or closed. In a further embodiment, the openings or slots are formed in the sides of the protective cover. In additional embodiments, the slots are formed such that the one or more rails extend through opposed sides of the protective cover.

In some embodiments, where the protective cover is mounted to at least one support beam, one or more mounting elements are configured to mount the cover body to the at least one support beam and/or the one or more rails. In one embodiment, the mounting element comprises a web, plate or flange for connecting the protective cover to the at least one support beam and/or the one or more rails. In a further embodiment, the mounting web, flange or plate is connected to the one or more rails by one or more fasteners.

The fourth aspect of the present invention may also have the features of the embodiments of the first, second or third aspects described above, or any combination of these aspects.

A fifth aspect of the invention provides a vibratory screen for separating mineral particles, comprising:
  a frame;
  at least one screen deck connected to the frame;
  one or more support beams for supporting the screen deck, wherein the support beams are connected to the frame; and
  a protective cover mounted to at least one support beam for deflecting material passing through the screen deck away from the at least one support beam.

In some embodiments, the protective cover is configured to deflect the material, which may be in the form of mineral particles and/or liquids. In other embodiments, the protective cover comprises one or more deflecting elements. In further embodiments, the protective cover may have one or more features of the embodiments according to the first aspect of the invention.

In some embodiments, the at least one screen deck comprises at least one screen surface and one or more rails supporting each screen surface, wherein the protective cover receives the one or more rails. In additional embodiments, the protective cover supports the one or more rails. In other embodiments, the protective cover comprises openings to receive the one of more rails. In further embodiments, the openings in the protective cover comprise slots. The slots may be open at one end or closed. In a further embodiment, the openings or slots are formed in the sides of the protective cover. In additional embodiments, the slots are formed such that the one or more rails extend through opposed sides of the protective cover.

In some embodiments, the protective cover is provided on each support beam.

In some embodiments, one or more mounting elements are configured to mount the cover body to the at least one support beam and/or the one or more rails. In one embodiment, the mounting element comprises a web, plate or flange for connecting the protective cover to the at least one support beam and/or the one or more rails. In a further embodiment, the mounting web, flange or plate is connected to the one or more rails by one or more fasteners.

In some embodiments, there are one or more interconnecting elements for interconnecting the one or more rails and the support beam. In other embodiments, the one or more interconnecting elements are mountable to the support beam. In another embodiment, the one or more interconnecting elements are mountable to an inner core of the support beam. In further embodiments, the one or more interconnecting elements are mountable to the outer polymeric shell of the support beam.

In other embodiments, the interconnecting elements comprise an interconnecting flange mountable to the support beam along one edge and connectable to the one or more rails. In one embodiment, the interconnecting flange comprising a mounting portion for mounting to the support beam and a connecting portion extending from the mounting portion. In further embodiments, the one or more rails are connected to one side or face of the connecting portion, preferably by fasteners.

In additional embodiments, the interconnecting elements may be integrally formed with the support beam, either the inner core or the polymeric outer shell. In yet other embodiments, the mounting portions is integrally formed with the support beam and the connecting portion is fitted or attached to the mounting portion.

In further embodiments, at least one portion of the interconnecting elements have a shape complementary to the shape of the at least one support beam. In one embodiment, the at least one support beam has an outwardly curved shape and the at least one interconnecting element portion has a corresponding inwardly curved shape. In another embodiment where the interconnecting element comprises the interconnecting flange, the mounting portion has the corresponding inwardly curved shape.

A sixth aspect of the invention provides a panel for a vibratory screen comprising:
  at least one outer carbon fibre layer;
  at least one inner carbon fibre layer; and
  at least one foam layer between the at least one inner and outer carbon fibre layers.

In some embodiments, there is one outer carbon fibre layer. In some embodiments, comprises multiple carbon fibre layers bonded together. In other embodiments, the carbon fibre layers are bonded together by an adhesive. In further embodiments, the outer carbon fibre layer comprises a plurality of layered carbon fibre sheets.

In some embodiments, there is one inner carbon fibre layer. In other embodiments, the inner carbon fibre layer comprises multiple carbon fibre layers bonded together. In other embodiments, the carbon fibre layers are bonded together by an adhesive. In further embodiments, the inner carbon fibre layer comprises a plurality of layered carbon fibre sheets.

In some embodiments, the at least one foam and carbon fibre layers are bonded by an adhesive.

In the above embodiments, the adhesive is an acrylic adhesive. In one particular embodiment, the adhesive is a methacrylate adhesive. In further embodiments, other adhesives may be used such as cyanoacrylate adhesives, epoxy adhesives and the like.

A seventh aspect of the invention provides a vibratory screen comprising:
  a frame having side panels; and
  at least one screen deck connected to the frame;

wherein at least one side panel comprises at least one outer carbon fibre layer, at least one inner carbon fibre layer with at least one foam layer between the at least one inner and outer carbon fibre layers.

In some embodiments, each side panel comprises at least one outer carbon fibre layer, at least one inner carbon fibre layer with at least one foam layer between the at least one inner and outer carbon fibre layers.

In some embodiments, the frame comprises an end panel connected to the side panels. In other embodiments, the end panel comprises at least one wear layer. The wear layer is preferably composed of polyurethane, but may be composed of other resilient materials that can provide resilience and resistance to corrosion and/or abrasion, such as carbon, carbon fibre, other plastics including polytetrafluoroethylene (PTFE) or polypropylene (PP), resin, ceramic and the like. In one embodiment, the at least one wear layer is formed on an inner side of the end panel. In further embodiments, the end panel comprises an outer carbon fibre layer, an inner carbon fibre layer with a foam layer between the inner and outer carbon fibre layers. In yet another embodiment, the end panel comprises a laminated plate comprising at least one carbon fibre layer.

The seventh aspect of the present invention in its embodiments may also have the features of the embodiments of the first, second, third, fourth, fifth or sixth aspects described above, or any combination of these aspects. For example, the vibratory screen may have the support beam of the second or third aspect and the protective cover for the support beam of the first aspect in addition to the at least one side panel having an outer carbon fibre layer, an inner carbon fibre layer with a foam layer between the inner and outer carbon fibre layers.

It will also be appreciated that other embodiments may incorporate any combination of the first, second, third, fourth, fifth, sixth and seventh aspects described above.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
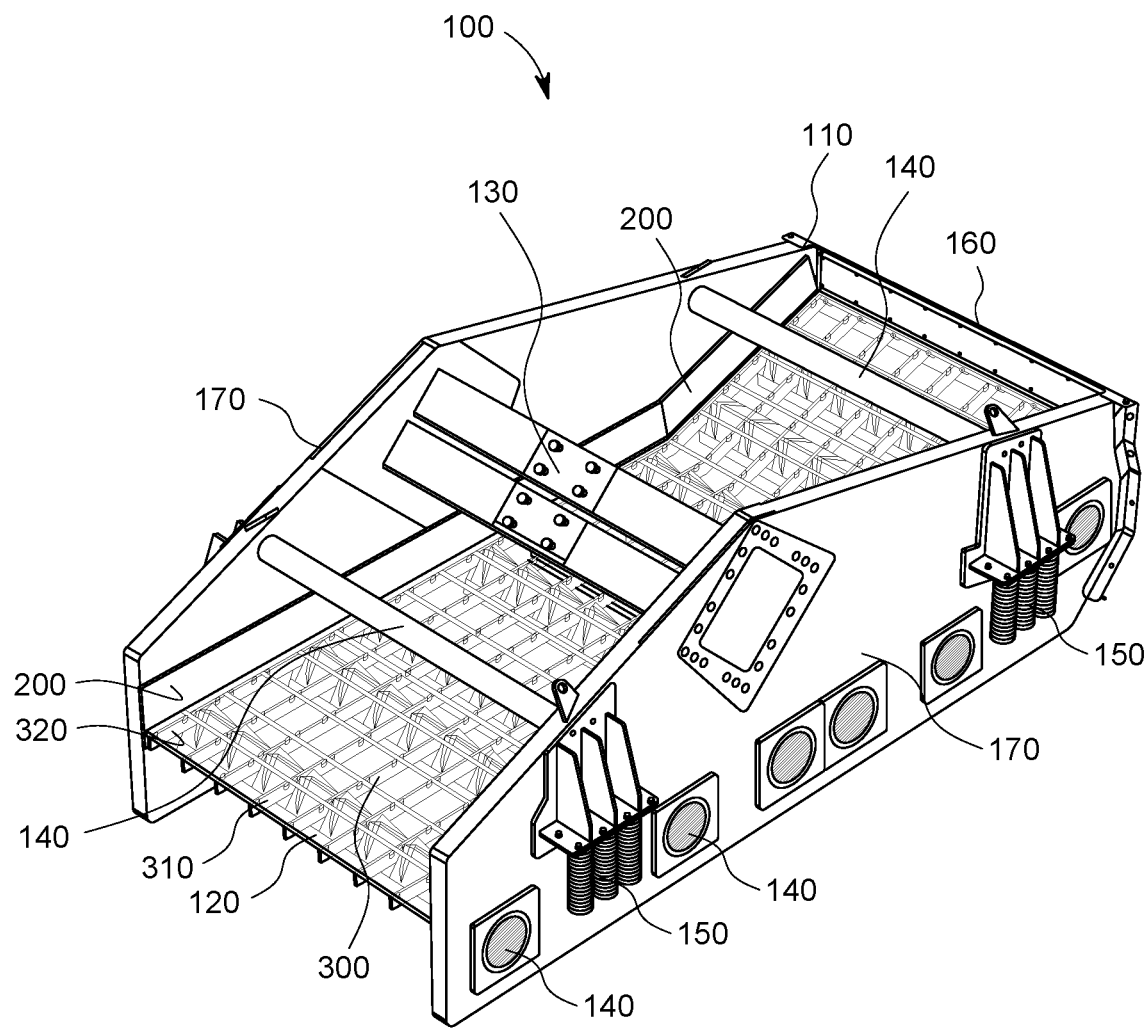
FIG. 1 is a perspective view of a vibratory screen according to an embodiment of the invention.

The present invention will now be described with reference to the following examples which should be considered in all respects as illustrative and non-restrictive. In the Figures, corresponding features within the same embodiment or common to different embodiments have been given the same reference numerals.

Figure 2:
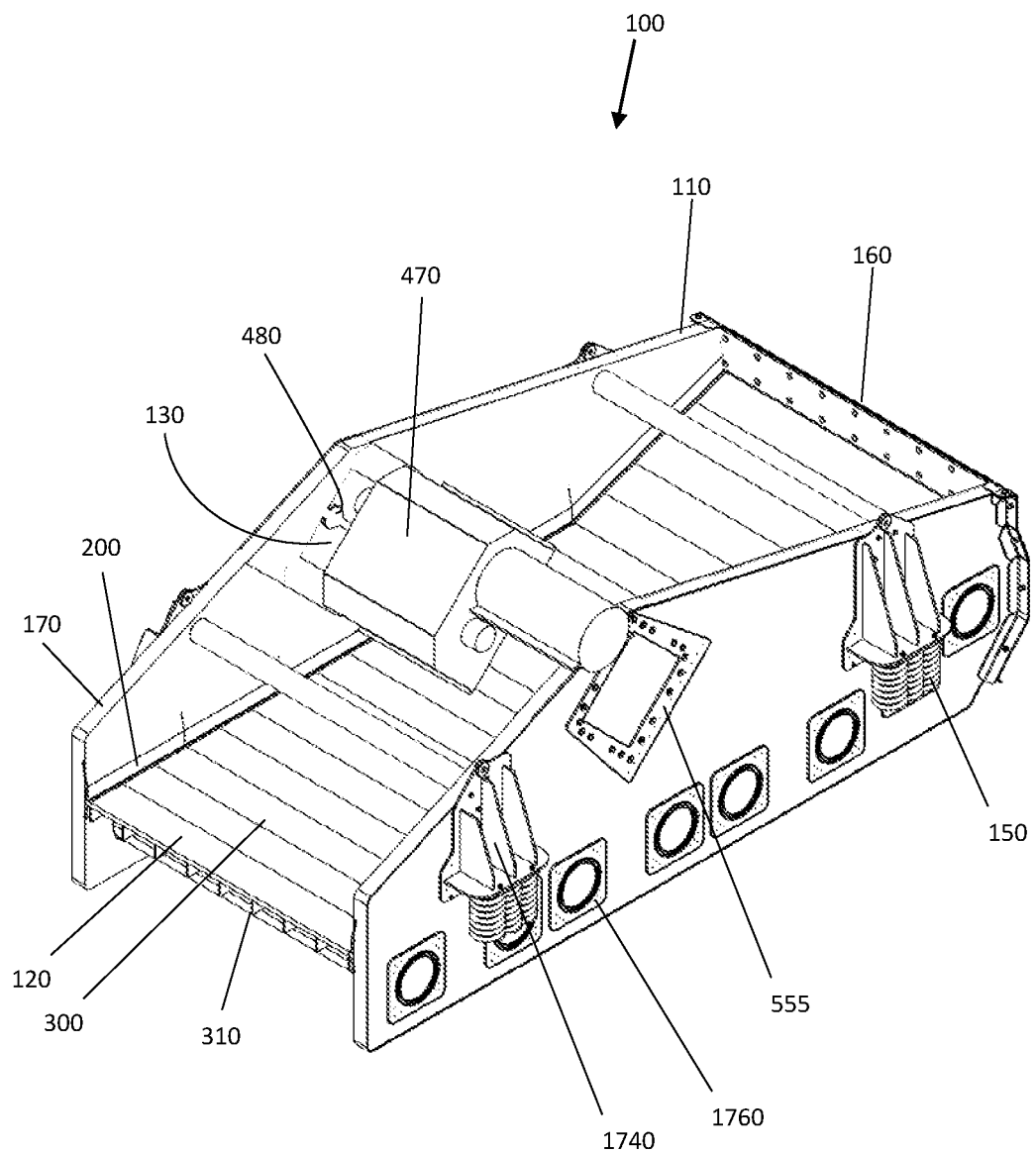
FIG. 2 is another perspective view of the vibratory screen shown in FIG. 1.
Figure 3:
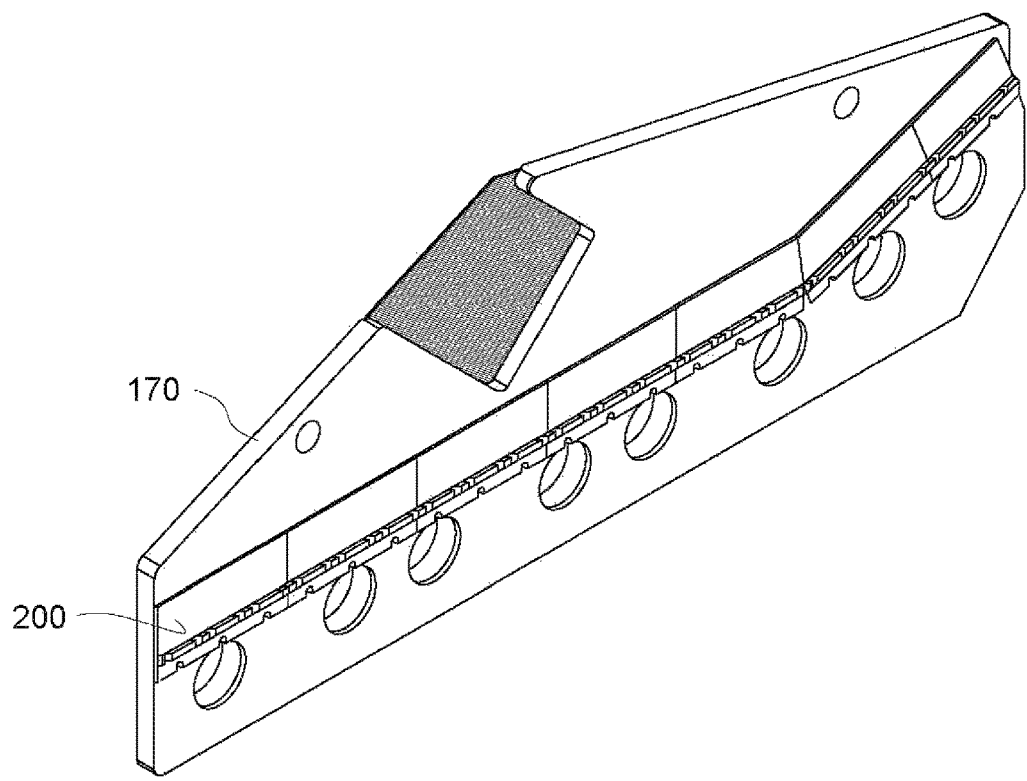
FIG. 3 is a partial perspective view of the side panel of the vibratory screen shown in FIG. 1.

Referring to FIGS. 1 and 2, a vibratory screen 100 having a frame 110, a screen deck 120, drive member assembly 130, supporting cross beams 140 and springs 150. The frame 110 has a back or rear panel 160 and two side panels 170. The screen deck 120 is connected to the rear panel 160 and side panels 170 of the frame 110.

The vibratory screen 100 in this embodiment has several improvements according to the invention that are designed to increase the longevity of the vibratory screen by making it more resistant to corrosion and/or abrasion during operation.

Figure 4:
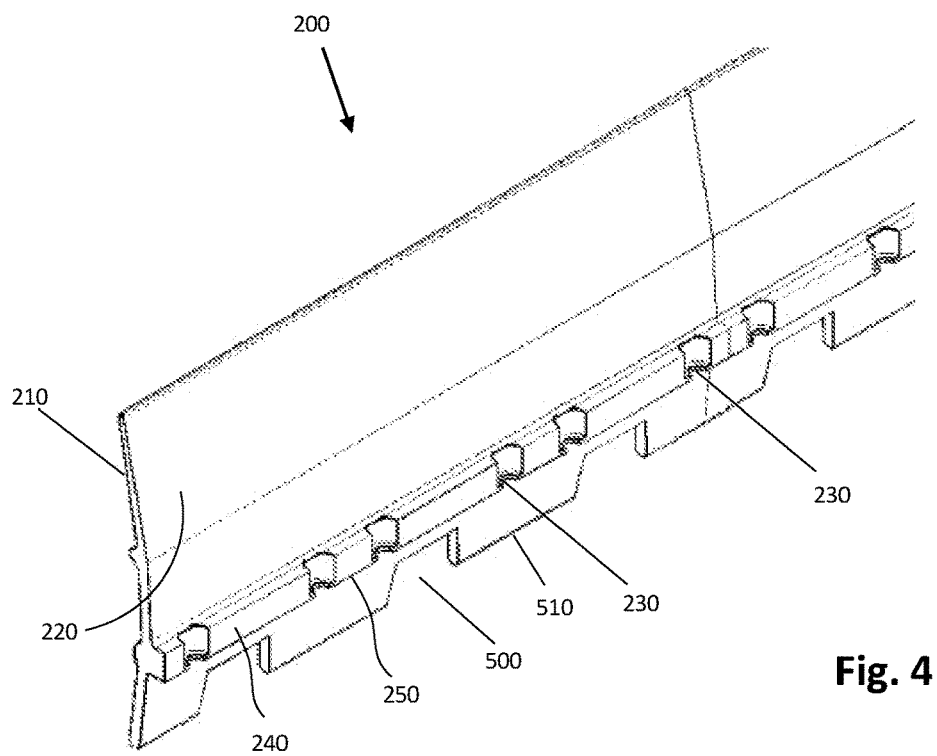
FIG. 4 is a partial perspective view of the protective plate shown in FIG. 3.
Figure 5:
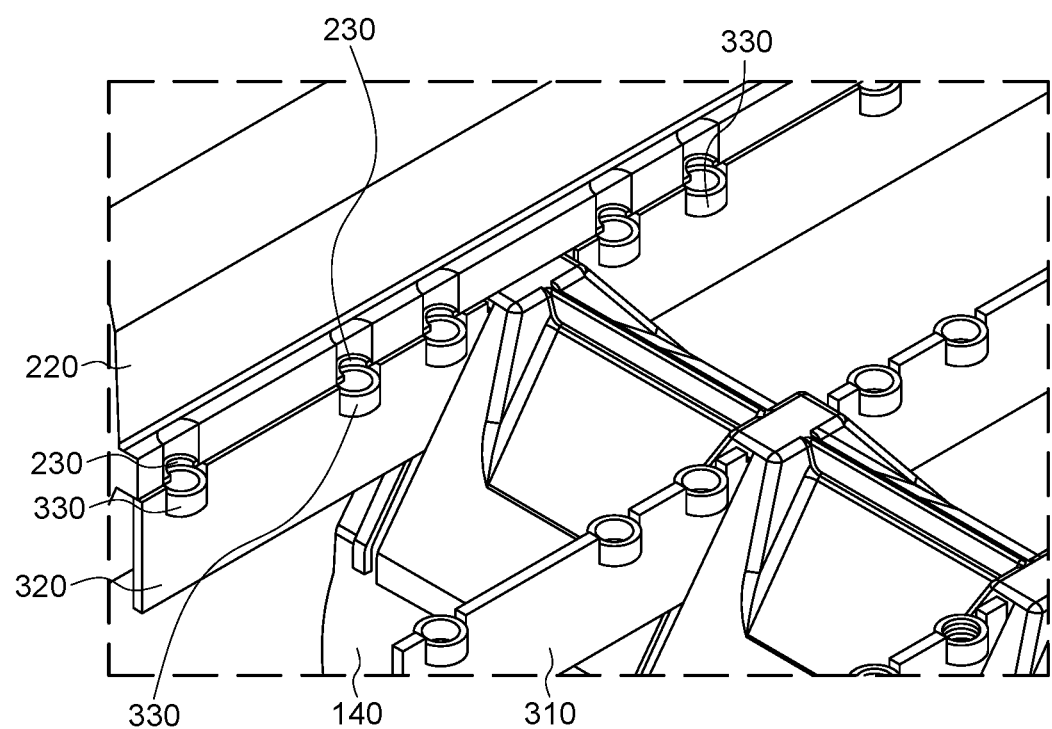
FIG. 5 is a partial close up perspective view of the protective plate shown in FIG. 3 fitted to the side panel and screen deck shown in FIGS. 1 and 2.
Figure 6:
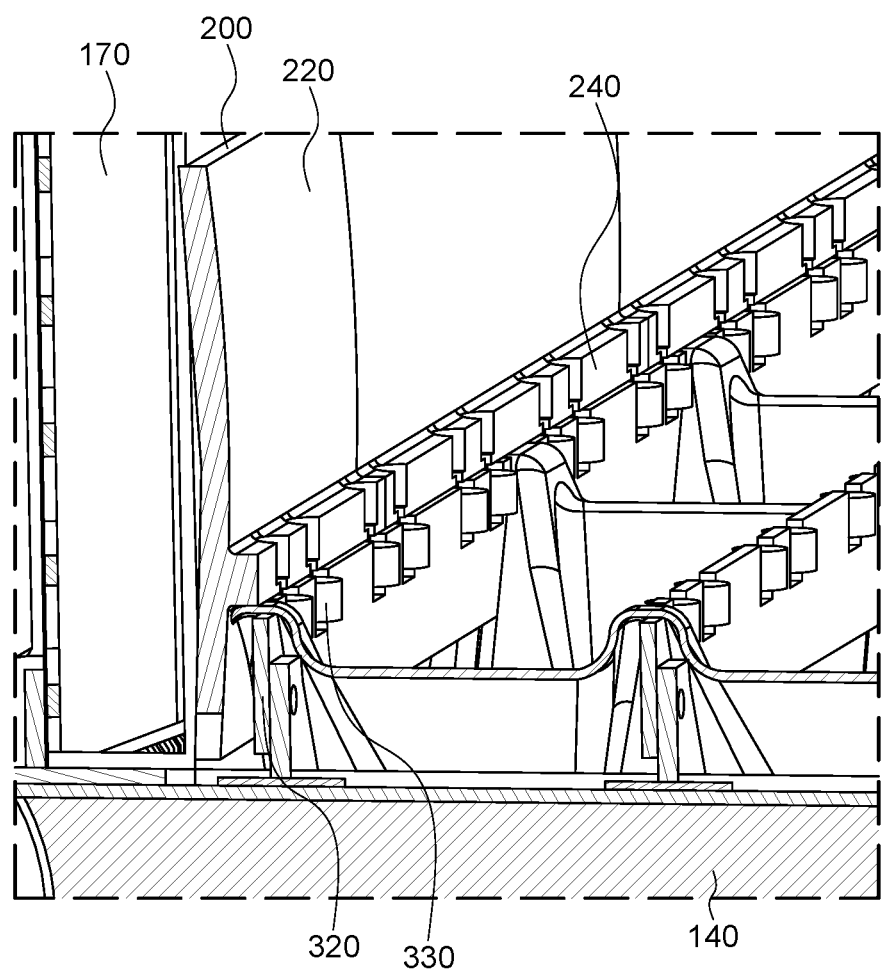
FIG. 6 is another partial close up perspective view of the protective plate shown in FIG. 3 fitted to the side panel and screen deck shown in FIGS. 1 and 2.

One improvement relates to the side panels 170 each having several protective plates 200 for protecting the side panels from damage and/or corrosion caused by the ore material being classified by the vibratory screen 100. Each protective plate 200 is composed of polyurethane and has an outer surface 210 for connecting the protective plate to the side panels 170 and an inner surface 220 for protecting the side panel. The inner surface 220 also has a plurality of connecting elements for connecting the protective plate 200 to the screen deck 120 in the form of U-shaped or C-shaped flanges 230 that are configured for cooperating with a corresponding connecting element of the screen deck 120, as best shown in FIGS. 4 and 5. The flanges 230 are located at several points along a protrusion in the form of a ridge 240 at its lower edge 250. As shown in FIGS. 5 and 6, the flanges 230 each have two arms for engaging the screen deck 120.

The screen deck 120 comprises a screen surface 300 supported by a plurality of rails 310 and the cross beams 140, as best shown in FIGS. 1 and 2. At least one rail 320 cooperates with the flanges 230 where the screen deck 120 is attached to the side panels 170, as best shown in FIGS. 5 and 6. The rail 320 has connecting elements in the form of collars 330 that complement the U-shaped or C-shaped flanges 230 of the protective plate 200. In this embodiment, a bolt, pin or rod (not shown) is inserted through the collar 330 and against the C-shaped flanges 230 to secure the screen deck 120, protective plate 200 and side panels 170 together. The screen deck 120 is also connected to the rear panel of the frame 110 via the rails 310, with the ends of the rails 310 being connected to the rear panel 160.

In operation, ore is fed onto the screen deck 120 and a drive mechanism such as a motor or exciter 470 causes the drive member assembly 130 to reciprocate, move or otherwise shake the frame 110, inducing vibrations in the screen deck 120. Consequently, the ore particles are classified or separated according to their size, with smaller ore particles passing through the screen deck 120 while large ore particles bigger than the openings or apertures in the screen deck 120 remaining on the screen surface 300. During this process, ore particles may strike at the side panels 170. However, the protective plates 200 shield the side panels 170 from these impacts, minimising or preventing damage to the side panels. In addition, the polyurethane composition of the protective plates 200 minimises the damage caused by these impact strikes, as well as being resistant to any corrosive substances in the ore and/or liquid in both dry and wet applications. Accordingly, the protective plates 200 minimise wear, abrasion and corrosion to the side panels 170 and thus increase the longevity of the vibratory screen 100.

When it is necessary to replace the protective plates 200 in the vibratory screen 100, the bolt, pin or rod is simply removed from the connecting flange 230 and collar 330. The rail 320 is then detached from the protective plate 200, which can be quickly removed from the side panel 170 and replaced. This process is performed quickly and easily, compared to the difficulty in removing a wedged in plate as in the prior art. Thus, labour is saved and downtime for the vibratory screen is reduced.

Another improvement relates to the drive member assembly 130. Referring to FIGS. 7 to 10, the drive member assembly 130 according to one embodiment of the invention has two drive beams or shafts 400 spaced apart and parallel to each other to form a void or gap 405 running along most of their respective lengths. The drive beams 400 are connected at their respective ends 410, 420 to mounting plates 450 for mounting to the side panels 170 of the frame 110. The drive beams 400 are formed from I-beams (i.e. two parallel flanges or sheets connected at their longitudinal axes by a perpendicular sheet to form an I-shape) that are connected to each other (generally, by welding) at their respective ends 410, 420. Alternatively, the I-beams may be cast as a single member. Mounting surfaces 460 are provided in the middle of the drive beams 400 with mounting holes 462 for receiving a drive mechanism 470 (as best shown in FIG. 2), such as a motor or exciter, to transmit motion to the drive beams, which then induce vibrations in the frame 110 and screen deck 120.

Figure 7:
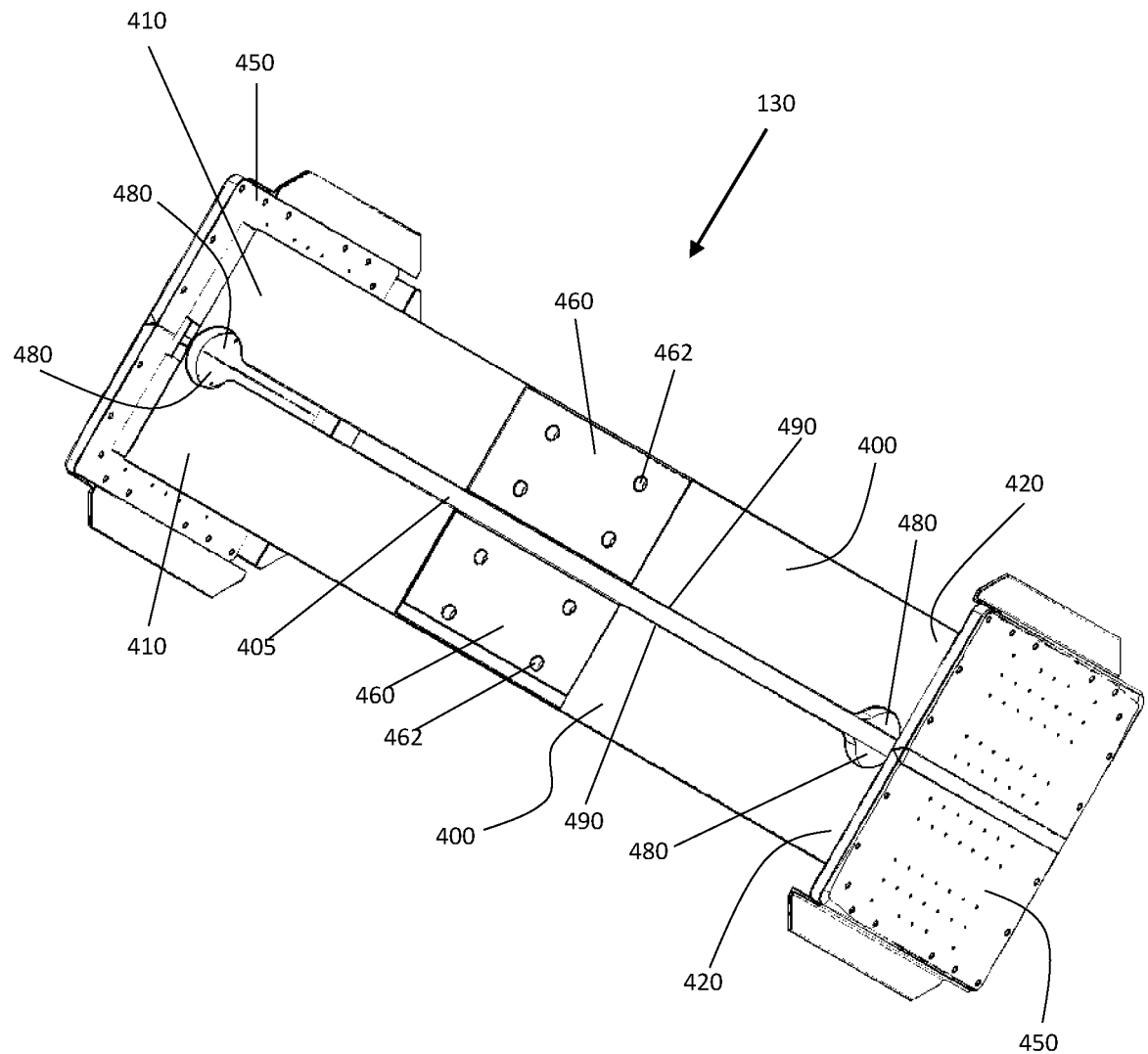
FIG. 7 is a perspective view of the drive member assembly shown in FIGS. 1 and 2.
Figure 8:
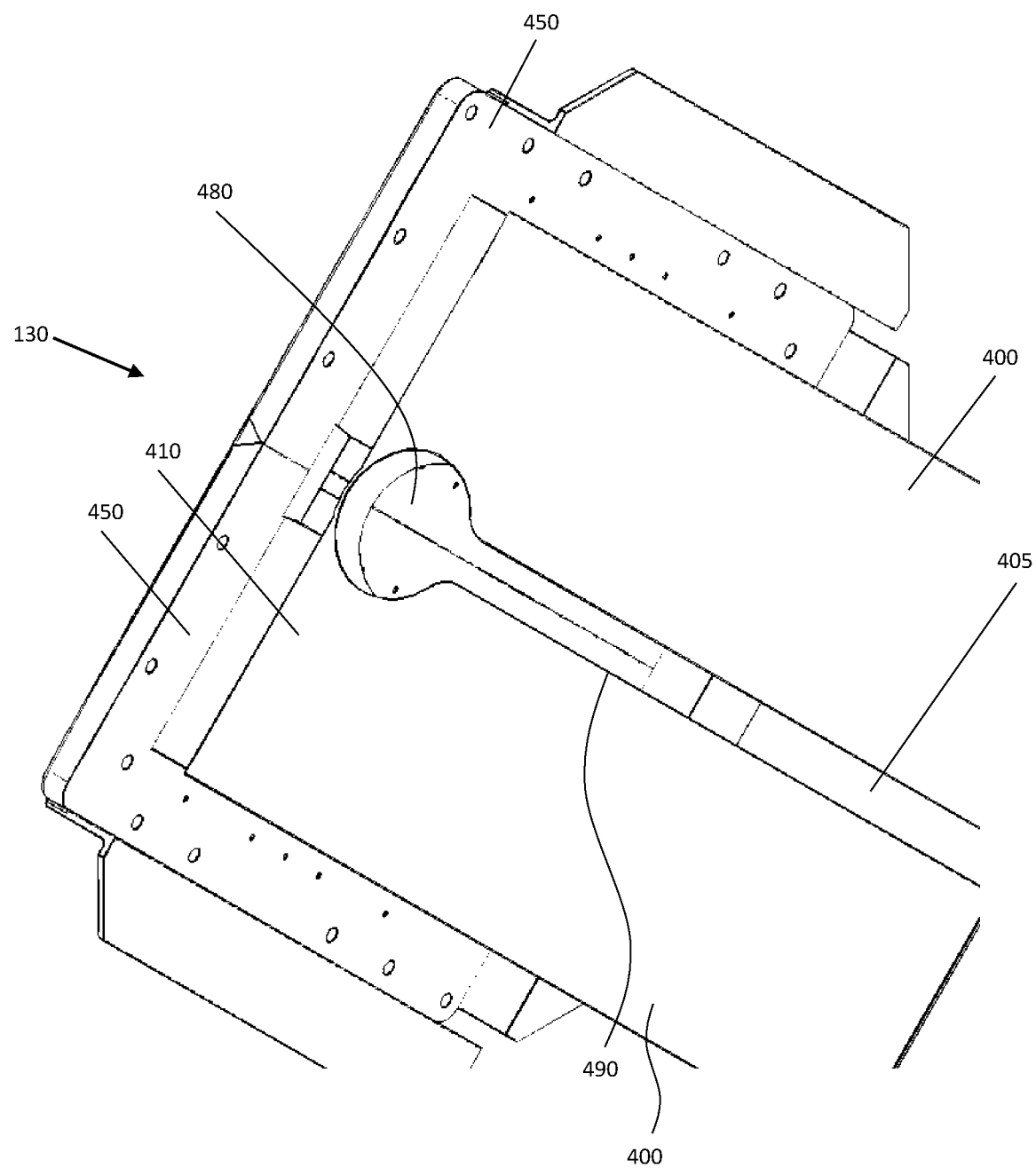
FIG. 8 is a partial close up perspective view of the drive member assembly shown in FIG. 7.

The drive beams 400 further have an opening in the form of a cut-out section or opening 480 that is curved or circular in shape, as best shown in FIGS. 7 and 8. The cut-out sections or openings 480 are formed along an inner edge 490 of each drive beam 400 adjacent each of the opposed ends 410, 420 and recessed into the body of the drive beam 400. The openings 480 are joined via the longitudinal gap 405 extending between the drive beams 400.

Figure 9:
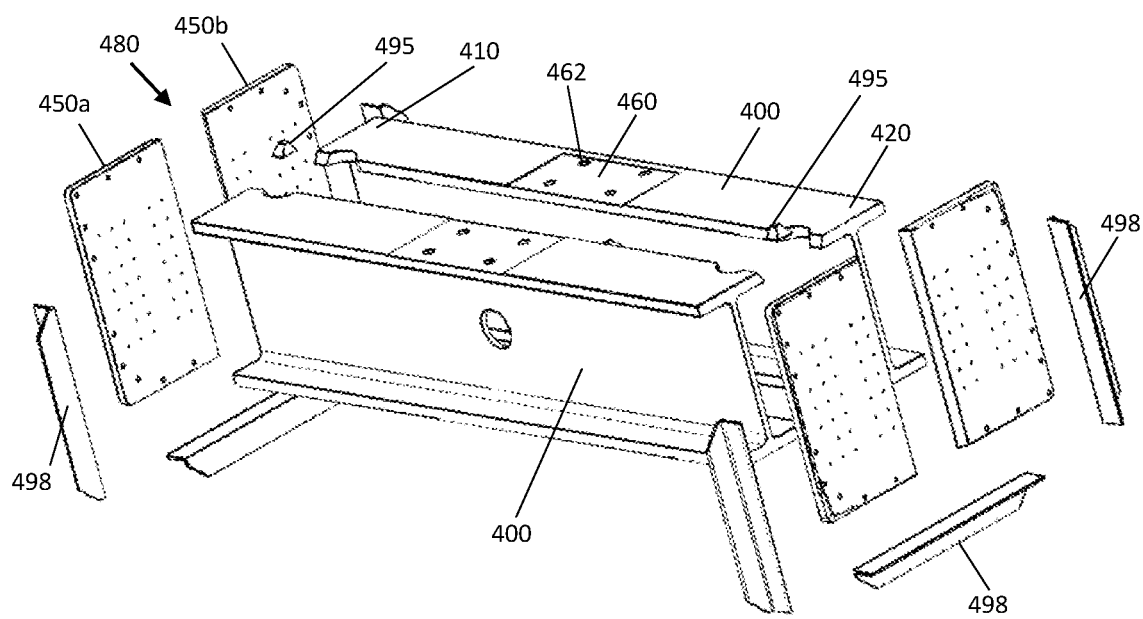
FIG. 9 is an exploded view of the drive beam assembly shown in FIG. 7.
Figure 10:
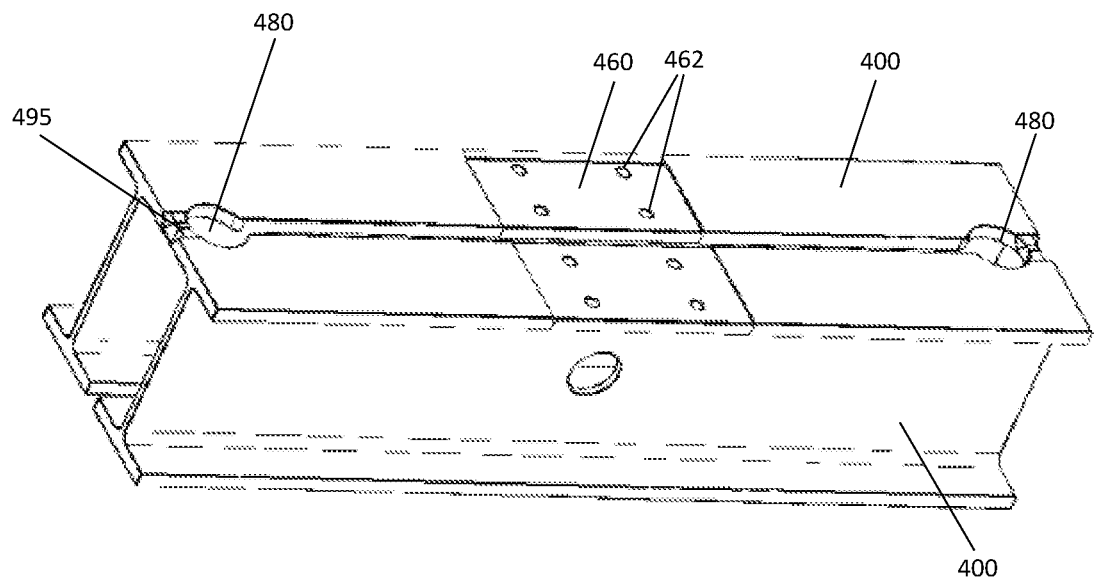
FIG. 10 is a perspective view of the drive beams of the drive member assembly of FIG. 7.

Referring to FIGS. 9 and 10, construction of the drive member assembly 130 is shown in more detail. Each drive beam 400 is formed from an I-beam and are welded together at their respective ends 410, 420 to mounting plates 450. A wedge shaped bridge or connecting portion 495 also connects the I-beam drive beams 400 adjacent their respective ends 410, 420 and curved openings 480. The mounting plates 450 comprise separate mounting plate portions 450*a*, 450*b* welded together and to side mounting flanges 498. While the separate components of the drive beam assembly 130 are joined by welding, other types of connections may be used. Also, the mounting plates 450 could be cast as a single piece instead of being assembled from separate components.

The cut-out sections or openings 480 are configured to relieve stress on the drive beams 400 and thus minimise the amount of fatigue placed on the drive beams during operation of the vibratory screen 100. The arcuate or curved profile of the cut-out sections or openings 480 evenly distribute stress forces applied to the drive beam 400, reducing stress concentrations that are likely to increase fatigue and lead to breakage. This stands in contrast to a conventional drive member assembly which has two I-beam members connected to mounting plates. It has been discovered that this conventional structure leads to concentrations of stress in the I-beam members, increasing the amount of fatigue and thus increasing the risk of breakage or damage.

Thus, in operation as described above, the motor or exciter 470 causes the drive member assembly 130 reciprocate, move or otherwise shake the frame 110 to induce vibrations in the screen deck 120 to classify the mineral ore particles. This places significant stress on the drive members 400 in the drive member assembly 130. However, due to the openings 480 this stress is distributed more evenly around the drive beams 400, significantly reducing the amount of stress on any particular portion of the drive members and reducing concentrations of that stress. This leads to less fatigue being suffered by the drive beams 400, increasing their longevity and so reducing the need to replacement of the drive member assembly 130. This leads to less maintenance and associated labour, saving replacement costs and reducing downtime for the vibratory screen 100.

Figure 11:
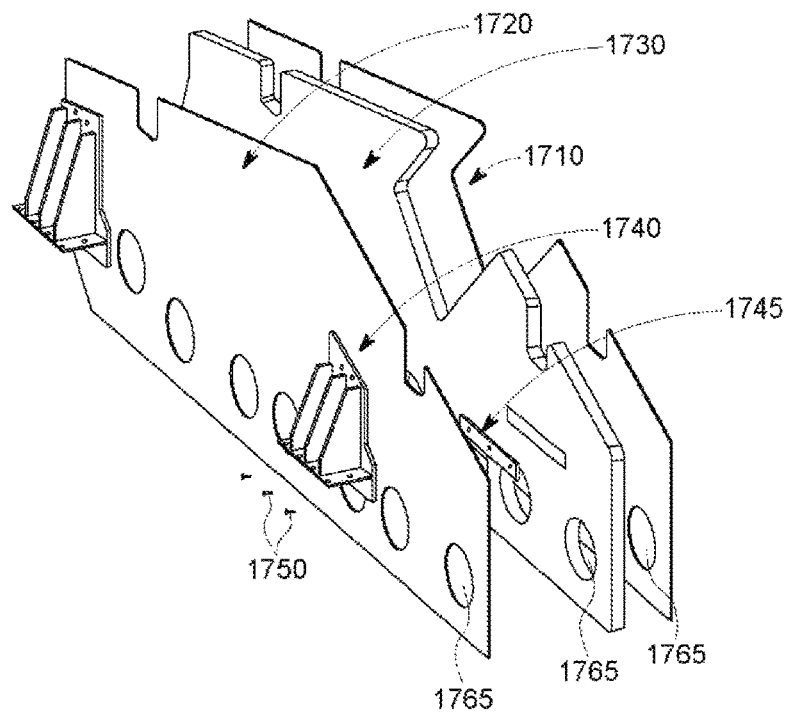
FIG. 11 is a partial exploded perspective view of the side panel of the vibratory screen of FIGS. 1 and 2.
Figure 12:
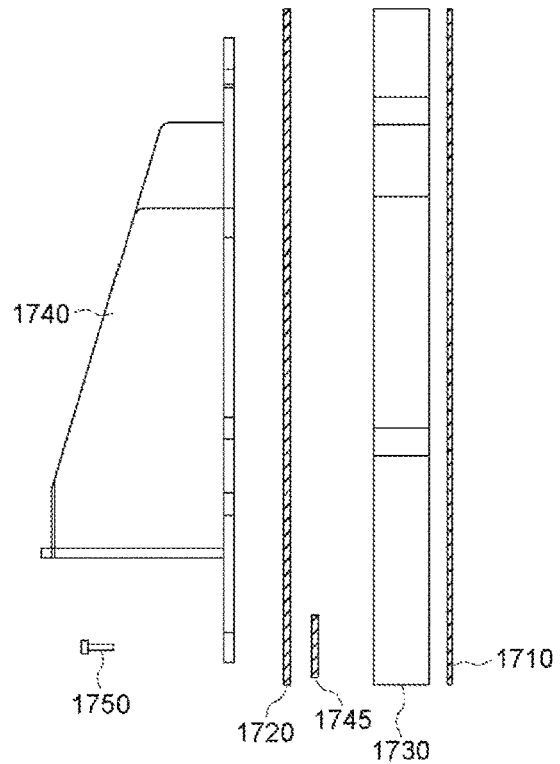
FIG. 12 is a partial exploded side view of the side panel of FIG. 11.

A further improvement is in the construction of the side panels 170. Instead of being formed by steel or stainless steel, the side panels 170 each comprise an inner carbon fibre layer 1710, an outer carbon fibre layer 1720 and a foam layer 1730 between the inner and outer carbon fibre layers, as best shown in FIGS. 11 and 12. However, in other embodiments, the side panels 170 may be formed of a plurality of inner carbon fibre layers 1710, a plurality of outer carbon fibre layers 1720, a plurality of foam layers 1730 or any combination therefor. For example, there may be a single foam layer 1730 with three outer carbon fibre layers 1720 and two inner carbon fibre layers 1710. The layers are formed as plates or sheets that are bonded together by a suitable adhesive, such as a methacrylate adhesive. One type of suitable methacrylate adhesive is Plexus® MA 310 adhesive. However, other suitable adhesives may be used, such as other adhesives may be used such as cyanoacrylate adhesives, epoxy adhesives and the like.

The foam layer 1730 is composed of polyethylene terephthalate (PET) and forms a core layer sandwiched between the inner carbon fibre layer 1710 and the outer carbon fibre layer 1720. In this way, the side panels 170 have a laminate structure, where the carbon fibre layers 1710, 1720 resist damage, corrosion and abrasion from impact and contact with mineral ore particles, while the foam core layer 1730 provides added resistance to fatigue and stress caused by vibrations induced by the exciter 470, as well as supporting the inner carbon fibre layer 1710 against impact strikes.

The side panel 170 has a minimal number of steel components, which are limited to the spring supports 1740, support plates 1745 for mounting the spring supports to the outer carbon fibre layer 1720 and fasteners 1750 in the form of bolts or screws to secure the spring supports to the side panel. A stainless steel mounting hub or flanged plate 1760 is fitted to openings 1765 in each of the layers 1710, 1720, 1730 to install the support beams 140 to the side panels 170. In some embodiments, the mounting hub may be composed other materials, preferably a resilient material, such as carbon, carbon fibre, other plastics including polytetrafluoroethylene (PTFE) or polypropylene (PP), resin, ceramic and the like The non-steel laminate structure for the side panels 170 ensures that there is a minimal risk of corrosion, which tends to occur in conventional vibratory screens due to either chemical reactions between the mineral ore and steel side panel or galvanisation between its steel components caused by metal to metal contact. At the same time, the carbon fibre and foam construction make the side panels 170 both strong and flexible, resulting in the vibratory screen 100 being resistant to fatigue, deformation and stress induced by the vibrations that flow throughout the vibratory screen during operation. The flexibility conferred by the side panels 170 makes the vibratory screen 100 more resistant to damage and breakage caused by mechanical resonance, which may especially occur with the reciprocating motion typically involved with vibrations used in these types of screens for the separation of mineral ore particles.

The rear or end panel 160 has an inner polyurethane wear layer 1610 similar to the protective plate 200 to minimise damage and corrosion. While the end panel 160 is generally composed of stainless steel (aside from its inner polyurethane layer 1610), in other embodiments, it may also have the laminate structure of the side panels 170. In addition, the wear layer 1610 may be composed of other resilient materials that can provide resilience and resistance to corrosion and/or abrasion, such as carbon, carbon fibre, other plastics including polytetrafluoroethylene (PTFE) or polypropylene (PP), resin, ceramic and the like. Similarly, in further embodiments, one side panel 170 may have the laminate structure instead of both side panels, if desired.

Figure 13:
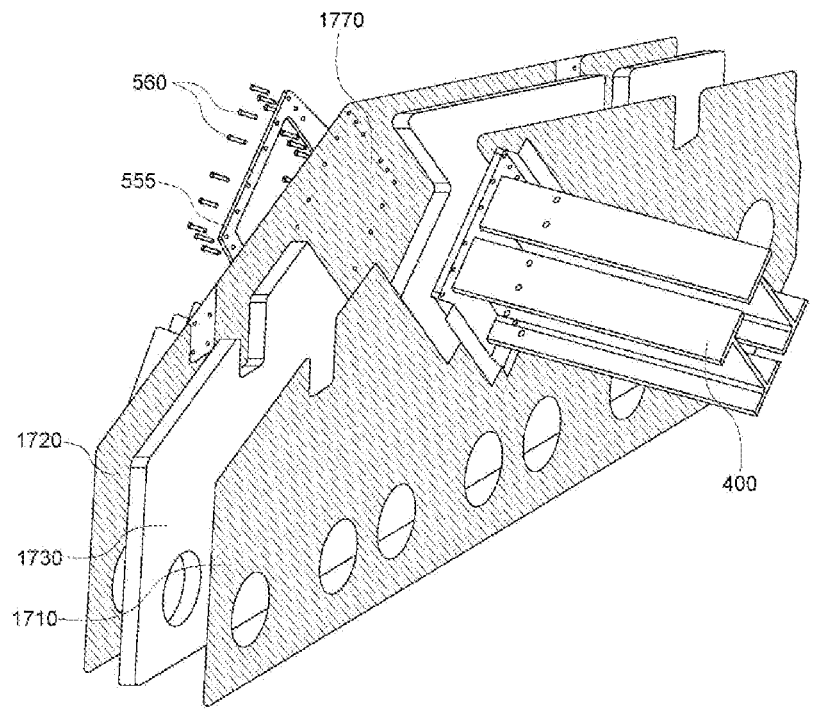
FIG. 13 is a partial exploded perspective view of the side panel of FIG. 11 with the drive beam assembly.
Figure 14:
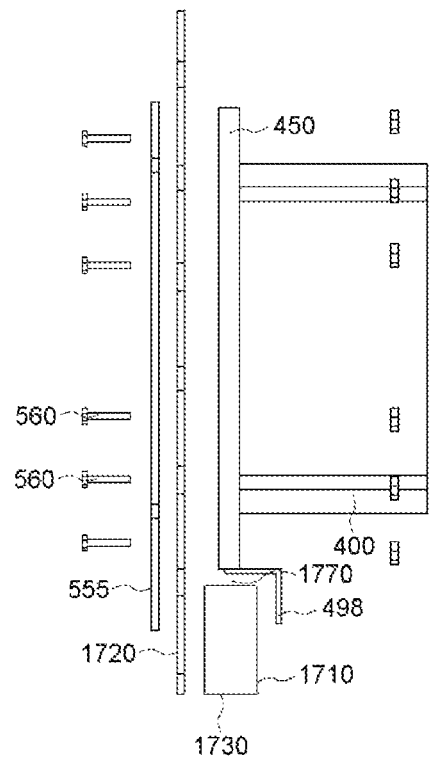
FIG. 14 is a partial exploded side view of the side panel of FIG. 13.
Figure 15:
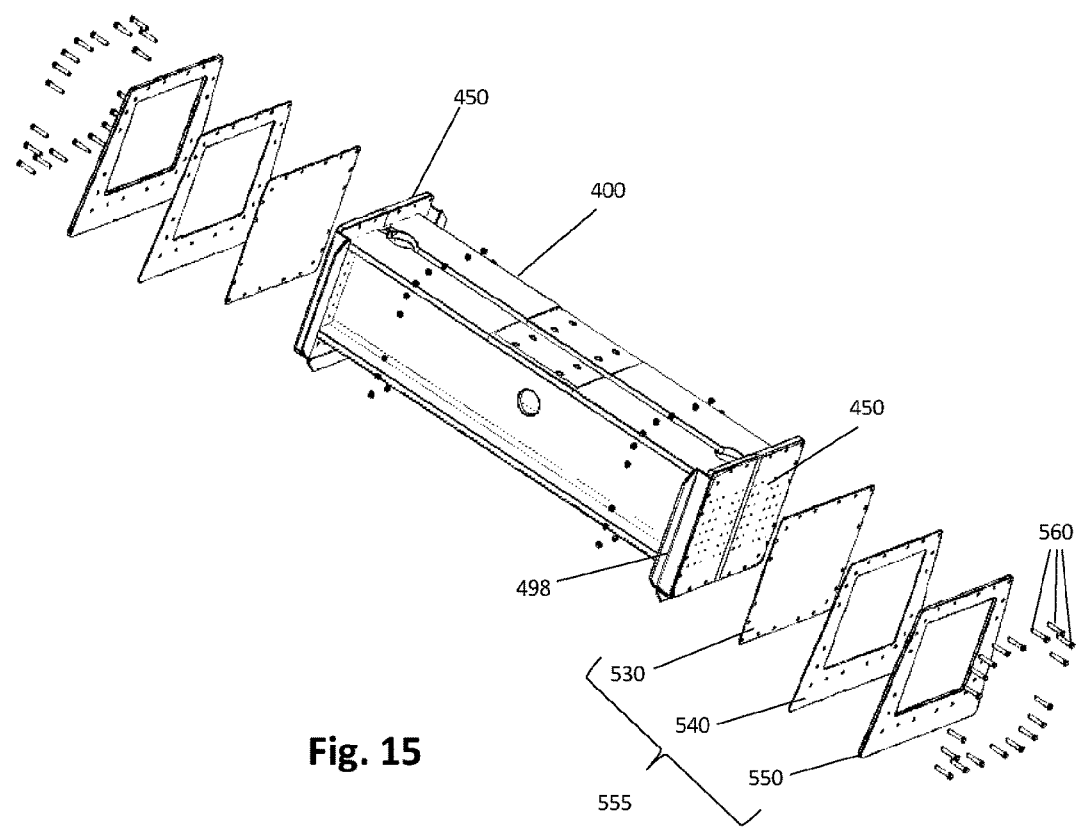
FIG. 15 is a partial exploded perspective view of the drive beam assembly shown in FIG. 7 and the attachment plates for mounting the drive beam assembly to the vibratory screen.

Referring to FIGS. 13 to 15, the drive beam assembly 130 is mounted to the side panels 170 of the vibratory screen 100 using a series of attachment plates 530, 540, 550 that form an attachment plate assembly 555 and fasteners in the form of bolts 560. As shown in FIGS. 11 and 12, the mounting plate 450 fits into a cavity 1770 formed in the inner carbon fibre layer 1710 and foam core layer 1730 of the side panel 170 to directly engage the outer carbon fibre layer 1720 of the side panel 170. The side mounting flanges 498 engage the edges of the cavity 1770 and part of the surface of the inner carbon fibre layer 1710. The attachments plates 530, 540, 550 are then assembled into the attachment plate assembly 555, which is connected to the outer carbon fibre layer 550 and mounting plate 450 via the bolts 560, as best shown in FIG. 12. In this manner, the drive beam assembly 130 is mounted to the side panels 170 but only directly contacts the carbon fibre or foam core layers of the side panels and not the steel attachment plates 530, 540, 550 of the attachment plate assembly 555. This connection arrangement minimises direct steel to steel contact of the attachment plates 530, 540, 550 with the mounting plate 450, reducing or eliminating the risk of galvanic corrosion caused by steel to steel contact of these components, thus increasing the longevity of the drive beam assembly 130.

Figure 16:
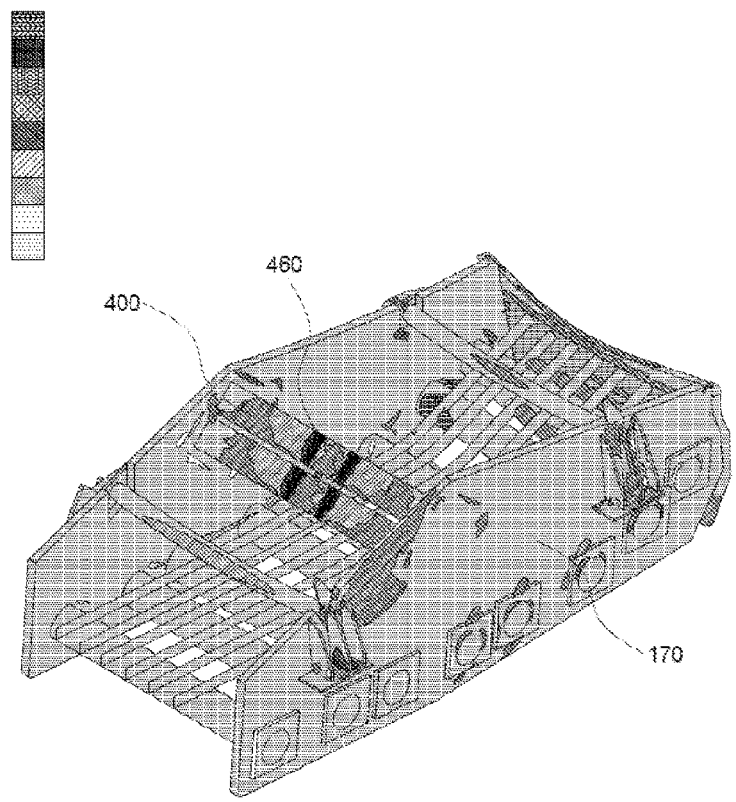
FIGS. 16 to 19 are finite element analysis maps illustrating the stress distribution across the vibratory screen of FIGS. 1 and 2 when in use.
Figure 17:
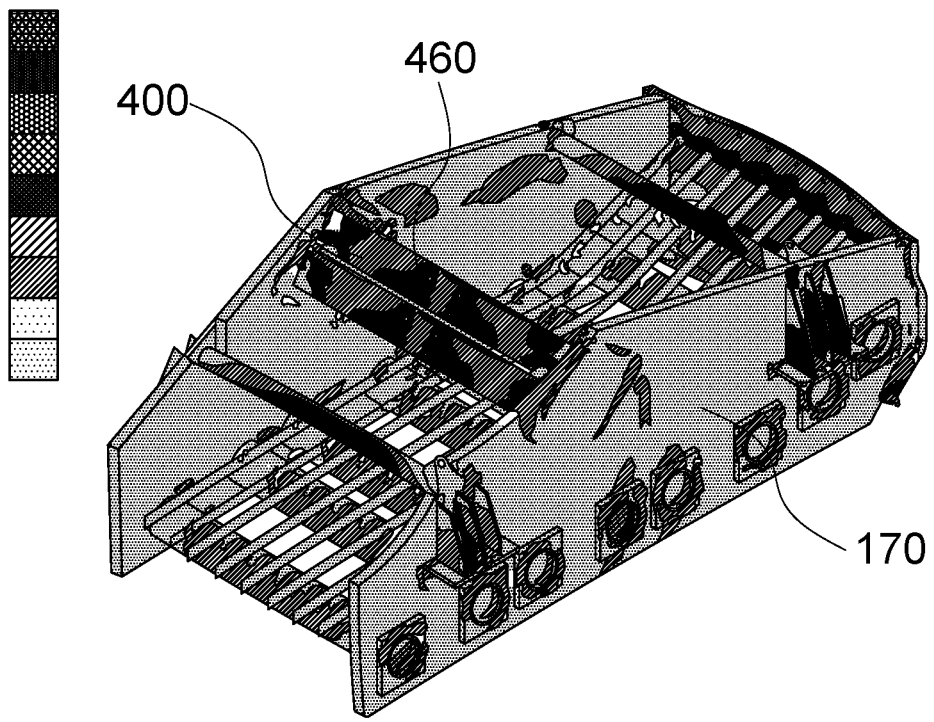
Figure 18:
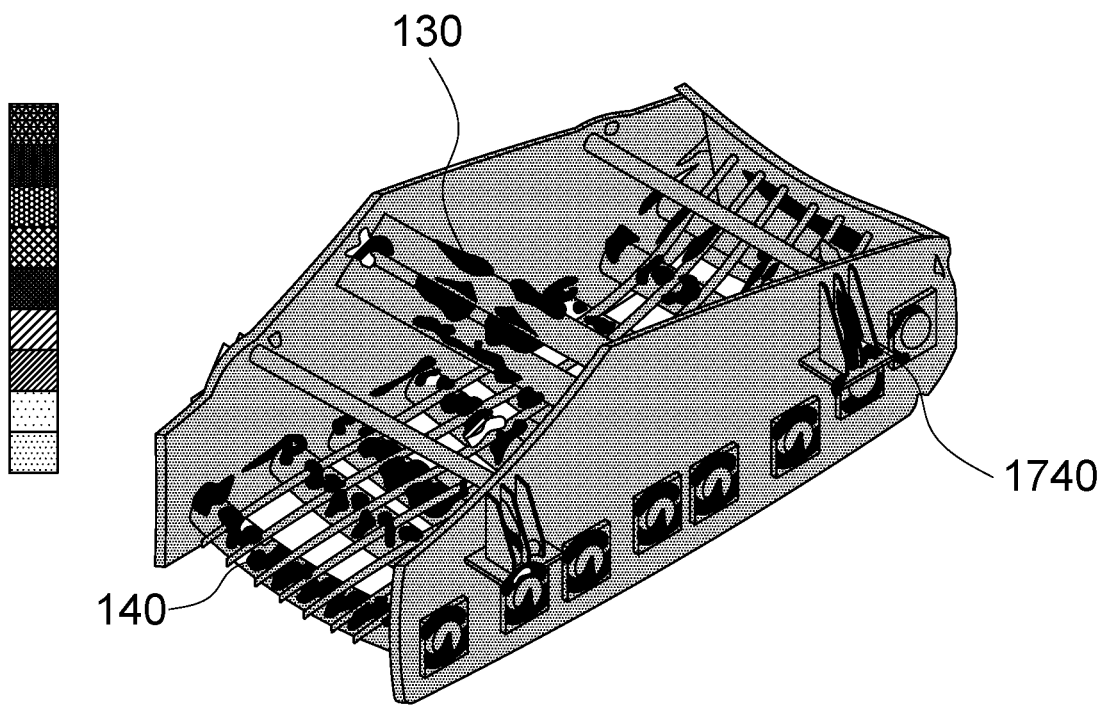
Figure 19:
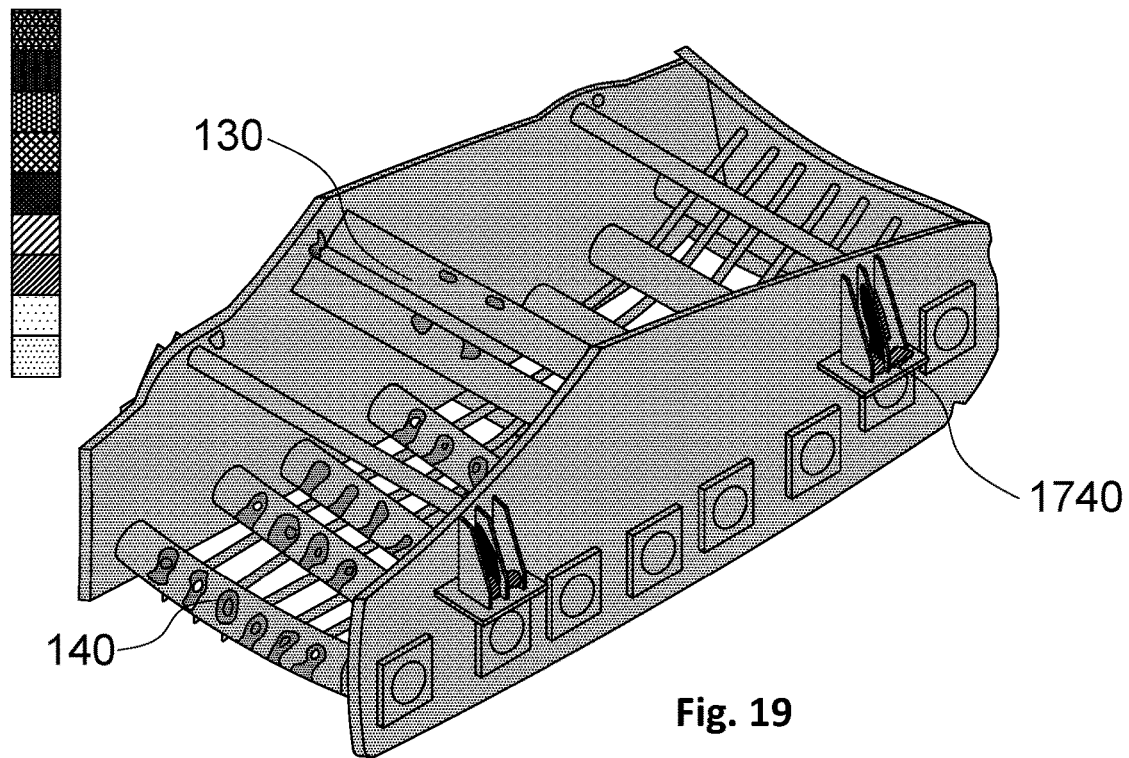
Figure 20:
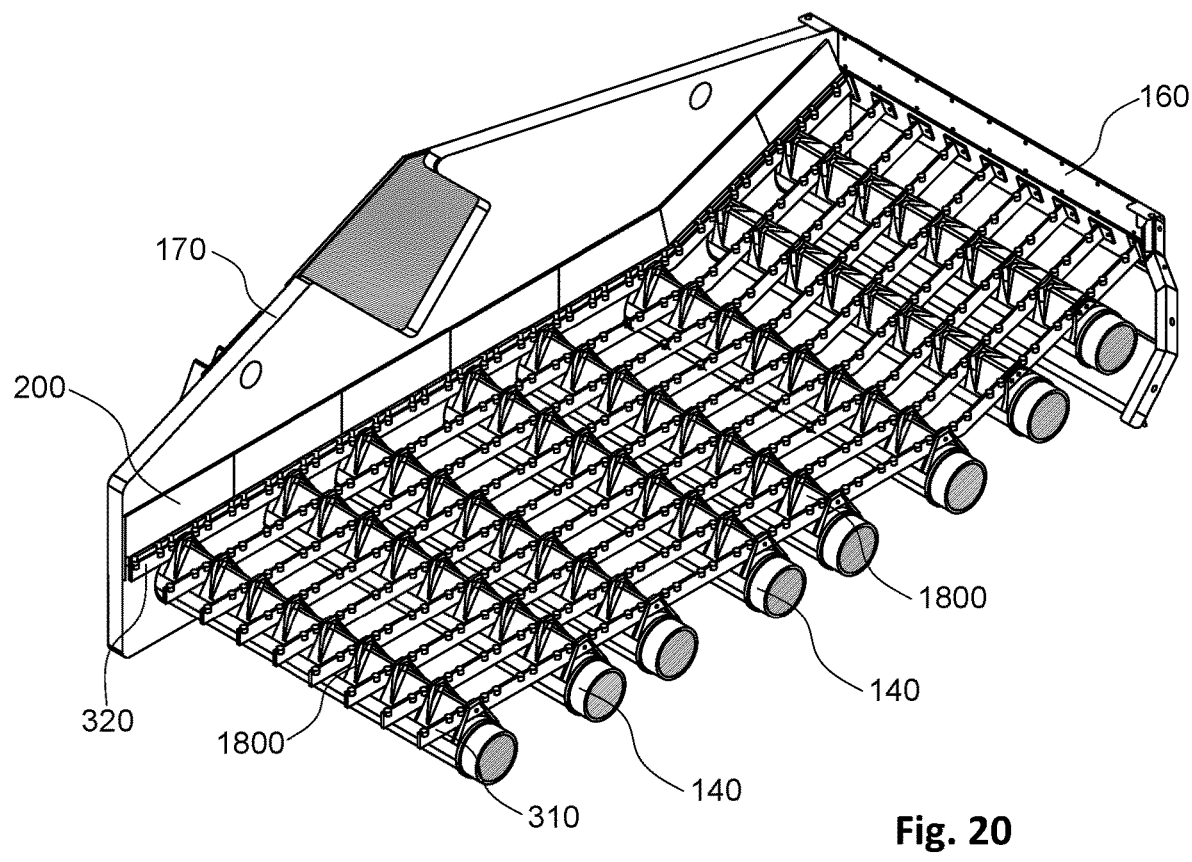
FIG. 20 is a partial perspective view of the vibratory screen of FIGS. 1 and 2 illustrating the connection of the support beams, rails, side panel and a protective cover.
Figure 21:
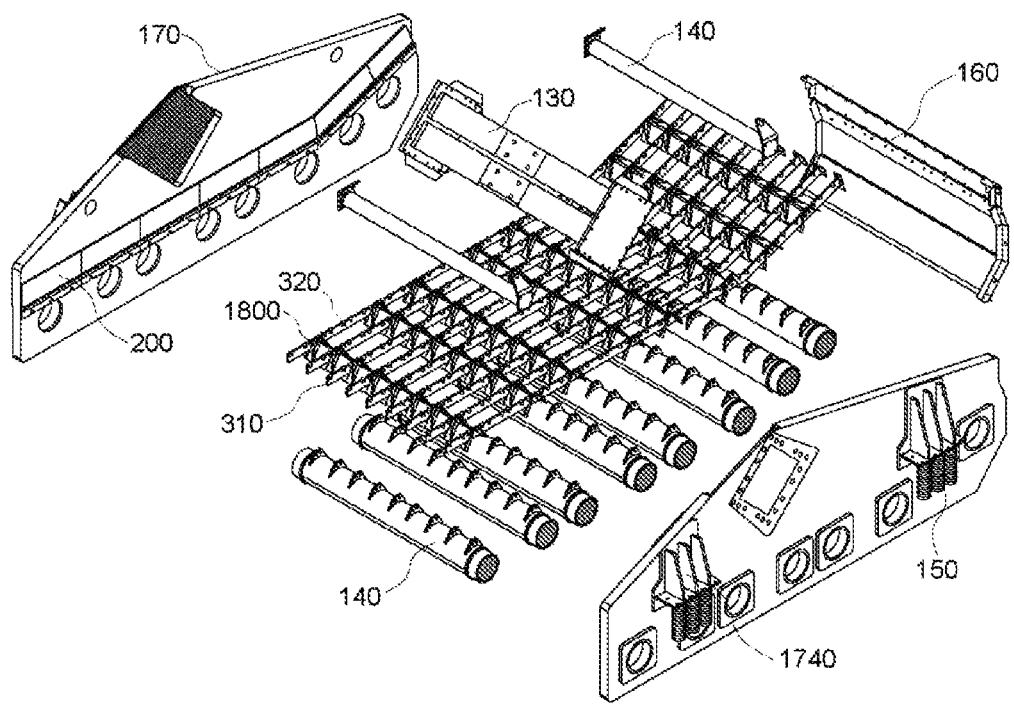
FIG. 21 is an exploded perspective view of the vibratory screen of FIGS. 1 and 2.

Referring to FIGS. 16 to 19, a finite element analysis was conducted in respect of the vibratory screen 100 to produce finite element analysis (FEA) maps for different times during operation of the vibratory screen. In each finite element analysis map, areas of relative stress in a structure are indicated by colours ranging from blue (little or no stress), green (low stress), yellow (moderate stress), yellow orange (high stress) and red (very high stress). FIG. 16 is the FEA map of the vibratory screen 100 when at the peak of the stroke of the exciter 470. This FEA map shows that there is very little stress applied to the side panels 170 and the overall structure of the vibratory screen, ranging from only about 3 MPa in the blue areas to about 38 MPa in the red areas corresponding to the mounting surfaces 460 of the drive members 400 that directly receive the exciter 470. Similarly, in FIG. 17 the FEA map is of the vibratory screen 100 at the bottom of the stroke of the exciter 470. In this figure, there is also very little stress applied to the side panels 170 and the overall structure of the vibratory screen, ranging from only about 2 MPa in the blue areas to about 55 MPa in the red areas, again at the mounting surfaces 460 of the drive members 400 that directly receive the exciter 470. In FIG. 18, the FEA map is of the vibratory screen 100 when operating with mineral ore particles striking and passing through the screen deck (omitted in the FEA map). Again, there is very little stress applied to the side panels 170 and the overall structure of the vibratory screen, ranging from only about 2 MPa in the blue areas to about 19 MPa in the greenish areas corresponding to the support beams 140, driver assembly 130 and spring supports 1740 that are flexing under the induced vibrations. In FIG. 19, the FEA map is of the vibratory screen 100 when operating with a full load of mineral ore. The vibratory screen 100 shows very little stress, especially at the side panels 170 and in its the overall structure, ranging from only about 1 MPa in the blue areas to about 19 MPa in the greenish areas corresponding to the support beams 140, driver assembly 130 and spring supports 1740 that are flexing under the induced vibrations. It can thus be seen, that while the vibratory screen 100 flexes or deforms during operation from the vibrations induced by the exciter 470, its overall structure suffers very little stress, especially in the side panels 170. This stands in contrast to conventional vibratory screens, which the inventors believe are often required to endure stresses of up to 38 to 40 MPa and thus suffer greater fatigue during operation. Consequently, the vibratory screen 100 is more robust and resilient to stress, due to the improvements in its construction, especially the side panels 170 support beams 140 and drive member assembly 130.

Thus, in operation as described above, the vibrator screen 100 receives vibrations throughout its structure as the drive member assembly 130 reciprocates, moves or otherwise shakes the frame 110 to induce vibrations in the screen deck 120 to classify the mineral ore particles. During this process, the frame 110, especially its side panels 170, resists damage, deformation and breakage that may be caused by these vibrations due to the stress-resistance properties conferred by the laminate structure of the inner and outer carbon fibre layers 1710, 1720 and foam core layer 1730. This results in increases longevity for the side panels 170, reducing the frequency of replacement and in turn reducing maintenance time and labour, and thus reducing downtime for the vibratory screen 100.

Yet another improvement relates to the protection of the support beams 140 for the screen deck 120. As previously described above, in operation of the vibratory screen 100, ore particles are classified or separated according to their size based on the size of the apertures or openings in the screen surface 300, with smaller ore particles passing through the screen deck 120 while large ore particles bigger than the openings or apertures in the screen deck 120 remaining on the screen surface. During this process, mineral ore particles may strike at components of vibratory screen 100, including the cross beams 140 located beneath the screen deck 120, especially by mineral ore particles passing through the screen deck. In addition, the chemical nature of the mineral ore being process may cause corrosion, especially in wet or dewatering applications. Furthermore, the vibrations apply stress throughout the vibratory screen components, including the cross beams 140, inducing fatigue and increasing the risk of breakage. To ameliorate the effects of this damage and corrosion, improvements have been developed in the form of a protective cover for the support beams as well as in the composition of the support beam itself.

Referring to FIGS. 20 to 29, a protective cover 1800 is provided on each support beam 140, comprising a cover body 1810 and deflecting elements 1820 for deflecting material away from the support beam. The protective cover 1800 is composed of polyurethane that is wear and abrasion resistant. In this embodiment, and as best shown in FIGS. 23 to 26, the cover body 1810 has a generally triangular prismatic shape with a hollow interior 1822 and two angled or inclined sides 1825, which have corresponding angled or inclined outer surfaces 1820 that define the deflecting elements. In other words, the deflecting elements comprise deflecting surfaces 1820 corresponding to the inclined surfaces of the sides 1825. Providing a hollow interior 1822 also reduces the weight of the support beam 140, making it more lightweight and less costly to produce.

Due the placement of the protective covers 1800 adjacent the screen deck 120, the protective covers could hinder or prevent flow of mineral ore particles through the screen surface 300. Accordingly, the deflecting surfaces 1820 have recessed portions 1830 arranged at intervals along the cover body 1810 for reducing the profile of the cover body to ensure that the mineral ore material is able to pass through the screen deck 120 without hindrance.

The cover body 1810 also has flattened top portions 1840 disposed at intervals along the length of the cover body for supporting the underside of the screen deck 120. A protrusion in the form or a ridge or fin 1845 is provided between the top portions 1840 for guiding mineral particles towards the deflecting surfaces 1820. A skirt portion 1850 is formed along each edge 1855 of the cover body 1810 for engaging the support beam 140.

Figure 26:
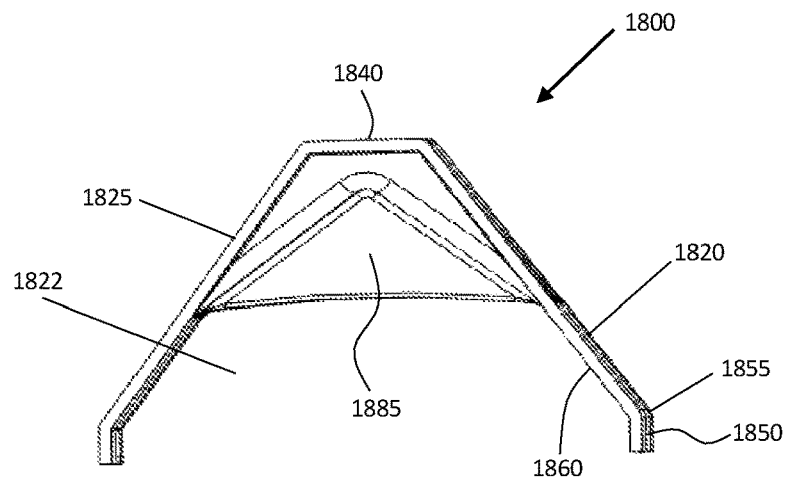
FIG. 26 is an end view of the protective cover shown in FIG. 22.

Reinforcing elements 1815 are provided on the cover body 1810 and take in the form of webs or ribs that extend between the inner sides 1860 of the cover body 1810, as best shown in FIG. 26. The reinforcement ribs 1815 provide additional rigidity to the protective cover 1800 to resist damage from mineral ore particles striking the cover body 1810 as they are deflected by the deflecting surfaces 1820.

The protective cover 1800 is further configured to receive the rails 310, 320 that support the screen deck 120. In this embodiment, the cover body 1810 comprises openings in the form of slots 1870 formed between the deflecting surfaces 1820 to receive the rails 310, 320. As best shown in FIGS. 23 to 25 and 27, the slots 1870 are formed such that the rails extend through opposed sides 1820 of the protective cover 1800. The slots 1870 may be open at one end, but in other embodiments they may be closed.

Figure 24:
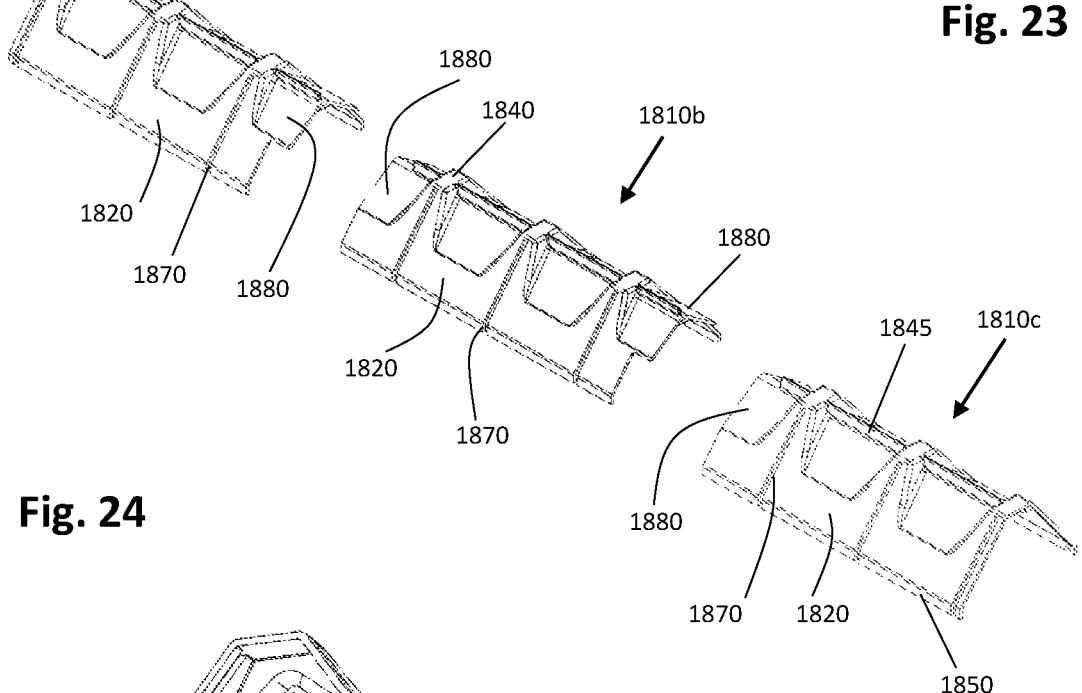
FIG. 24 is an exploded perspective view of the protective cover shown in FIG. 22.
Figure 25:
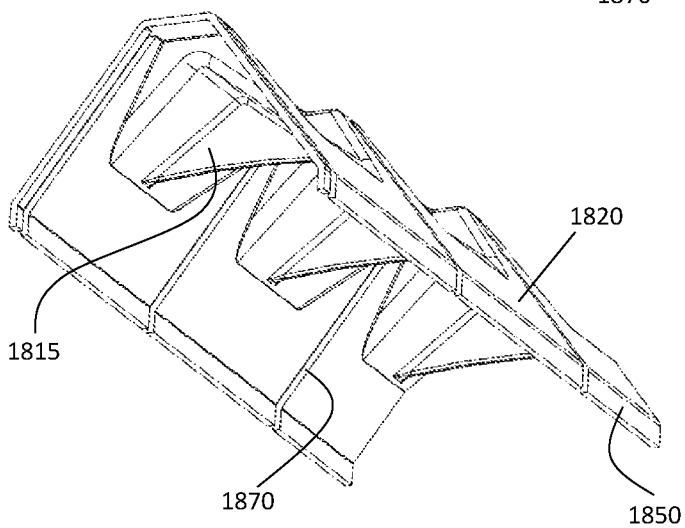
FIG. 25 is a underneath perspective view of a sub-component of the protective cover shown in FIG. 24.

Referring to FIG. 24, the protective cover 1800 is formed by three separate cover components 1810a, 1810b, 1810c. The cover components 1810a, 1810c form the end sections of the protective cover 1800 while the cover component 1810b forms a middle section of the protective cover that interconnects the two end sections. The cover components 1810a, 1810b, 1810c have complementary connecting surfaces 1880 that overlap each other when the cover components 1810a, 1810b, 1810c are assembled to form the protective cover 1800. In other embodiments, the protective cover may be formed as a single unit, rather than being assembled from the cover components 1810a, 1810b, 1810c.

Referring to FIGS. 5, 6 and 27 to 29, to install the protective covers 1800 to the support beam 140, interconnecting elements in the form of flanges 1410 are initially mounted to each support beam 140 and then the rails 310, 320 are mounted to flange 1410. The protective covers 1800 are then placed over the flange 1410 and the rails 310, 320. The screen deck 120 is then placed on top of the rails 310, 320 and the top portions 1840 of the cover body 1810. Pins or rods (not shown), such as standard lock pins, are used to secure the rails 310 to the screen deck 120. Due to the weight of the screen deck 120, the protective cover 1800 is held in place on the support beams 140 and rails 310, 320. Effectively, the protective covers 1800 are sandwiched between the screen deck 129 and the rails 310 and support beams 140 without requiring affixing by fasteners or otherwise being mounted. Of course, in other embodiments, the protective covers may be mounted to any one of the screen deck 120, rails 310 or support beams 140, if required, by using separate mounting elements, such as flanges or fasteners.

Figure 28:
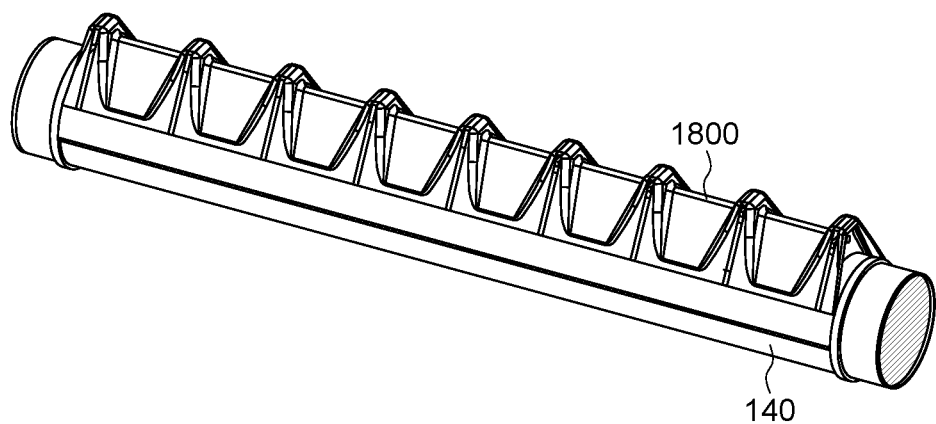
FIG. 28 is a perspective view of the protective cover and support beam shown in FIG. 27.
Figure 29:
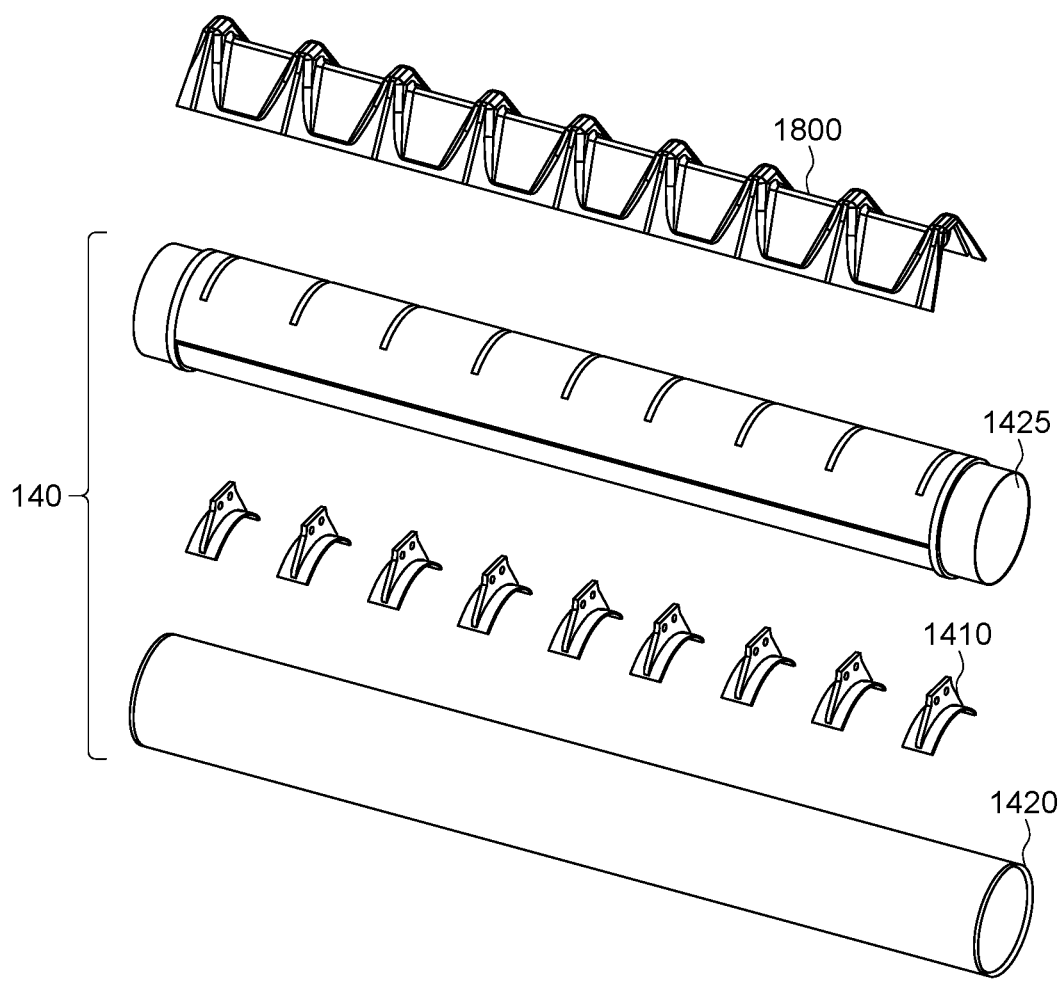
FIG. 29 is an exploded perspective view of the protective cover and support beam shown in FIG. 27.

As best shown in FIGS. 28 and 29, the support beam 140 in a further improvement generally comprises an inner beam core 1420 composed of carbon fibre layers bonded together. In this embodiment, the carbon fibre layers are bonded together by an adhesive, preferably a methacrylate adhesive. The support beam 140 also has an outer polymeric shell 1425 formed on the outermost carbon fibre layer, as best shown in FIG. 29. In this embodiment, the outer polymeric shell 1425 is composed of polyurethane.

The inner core 1420 is a substantially hollow member to reduce the weight of the support beam 140. However, it will be appreciated the inner core 1405 need not be hollow. In addition, the inner core 1405 is formed as a substantially cylindrical tube, but in other embodiments, the inner core may have other cross-sectional shapes, including oval, circular, rectangular, square, triangular, hexagonal, octagonal, decagonal, dodecagonal and any other polygonal shape. Similarly, the inner core 1405 may be formed as a combination of these polygonal shapes or have partly polygonal shapes, such as those outlined above.

Figure 22:
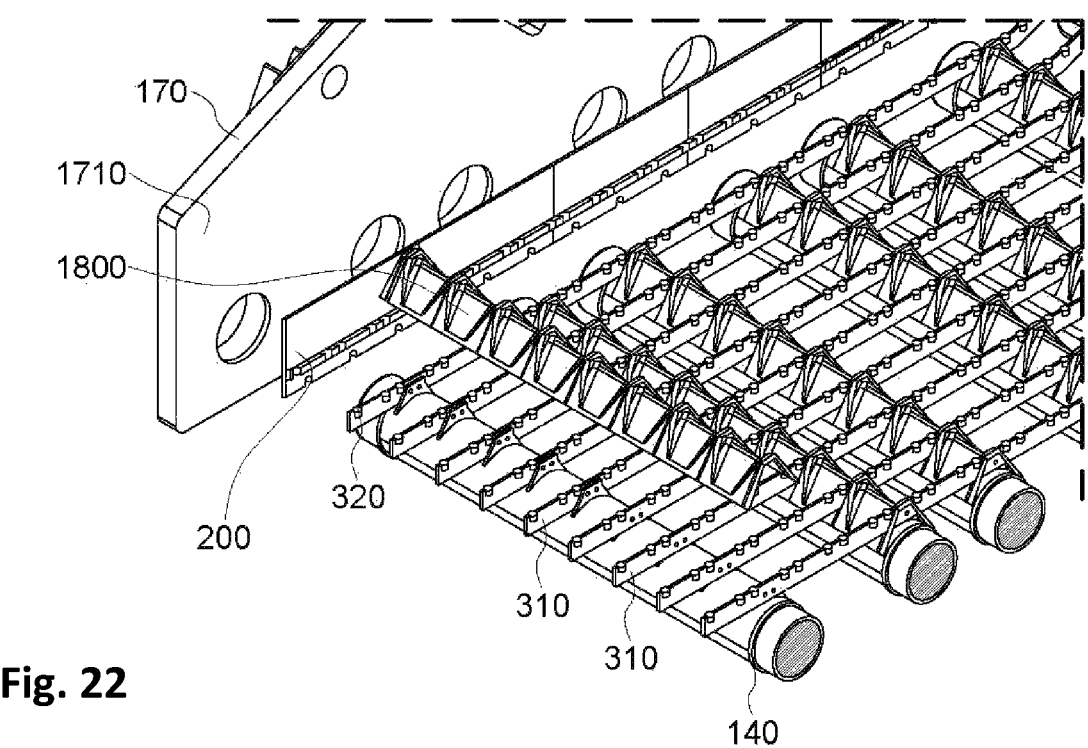
FIG. 22 is a partial close up perspective view of the connection shown in FIG. 20.
Figure 23:
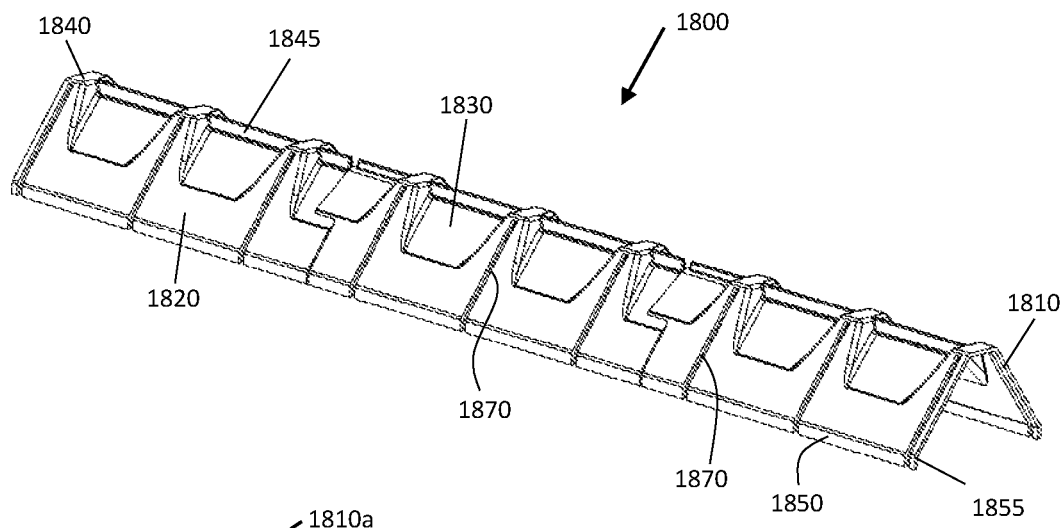
FIG. 23 is a perspective view of the protective cover shown in FIGS. 20 to 22.
Figure 27:
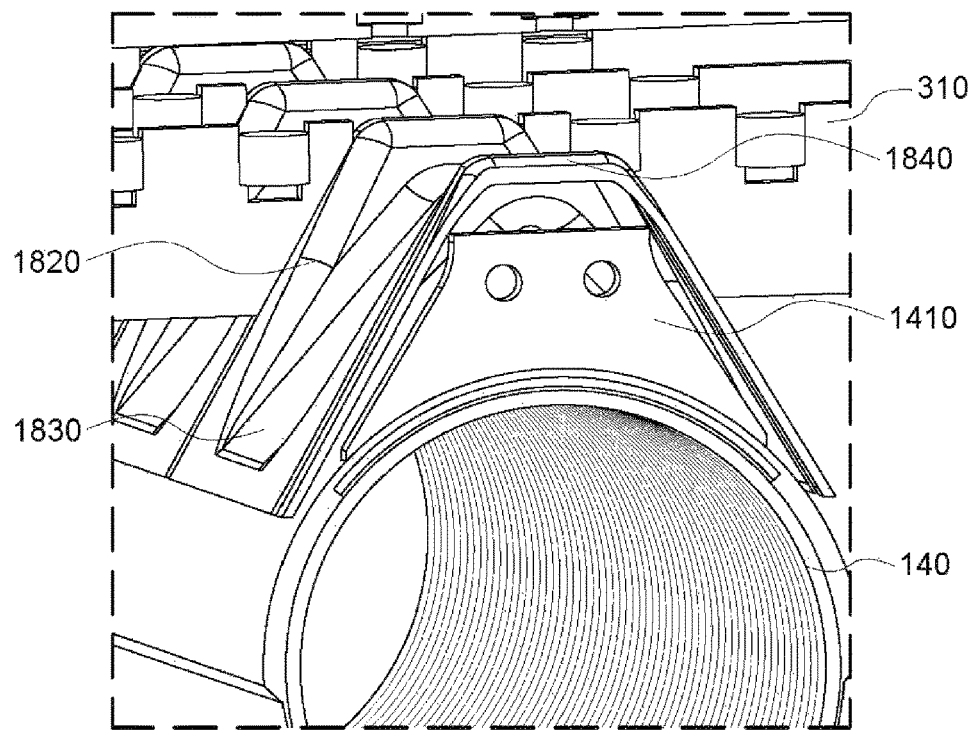
FIG. 27 is a partial close up perspective view of the protective cover and support beam.

The flanges 1410 are mounted to the support beam 140 and comprise a mounting portion in the form of a substantially curved mounting plate 1430 and a connecting portion in the form of a connecting plate 1440 standing substantially upright on the mounting plate. The flange 1410 is bonded onto the surface of the inner core 1420 via its mounting plate 1430 and the outer polymeric shell 1425 is then formed around the inner core and the mounting plate. The outer polymeric shell 1425 generally conforms to the same shape as the inner core 1405; i.e. as a substantially cylindrical tube. However, it is possible for the outer polymeric shell 1425 to adopt a different cross-sectional shape to the inner core 1405, including oval, circular, rectangular, square, triangular, hexagonal, octagonal, decagonal, dodecagonal and any other polygonal shape. Also, the outer polymeric shell 1425 may be formed as a combination of these polygonal shapes or have partly polygonal shapes, such as those outlined above The polymeric material of the outer shell 1425 acts effectively as a brace and maintains the separation of the flanges along the length of the support beam 140. This ensures that support beam 140 correctly engages with the protective cover 1800 and collection tray (not shown) underneath. The connecting plate 1440 has a substantially curved bottom edge corresponding to the substantially curved mounting plate 1430 and has a generally triangular prism shape to complement the inner profile of the cover body 1810 of the protective cover 1800. The rails 310 are connected to the connecting plate 1440 by fasteners, such as bolts, so that the rails are fixed to the support beams 140, as best shown in FIGS. 22 and 27. In other embodiments, the flange 1410 may be mounted to the outer polymeric beam shell 1425 by a suitable adhesive, such as a methylacrylate adhesive, or fasteners, such a bolts (not shown).

Figure 30:
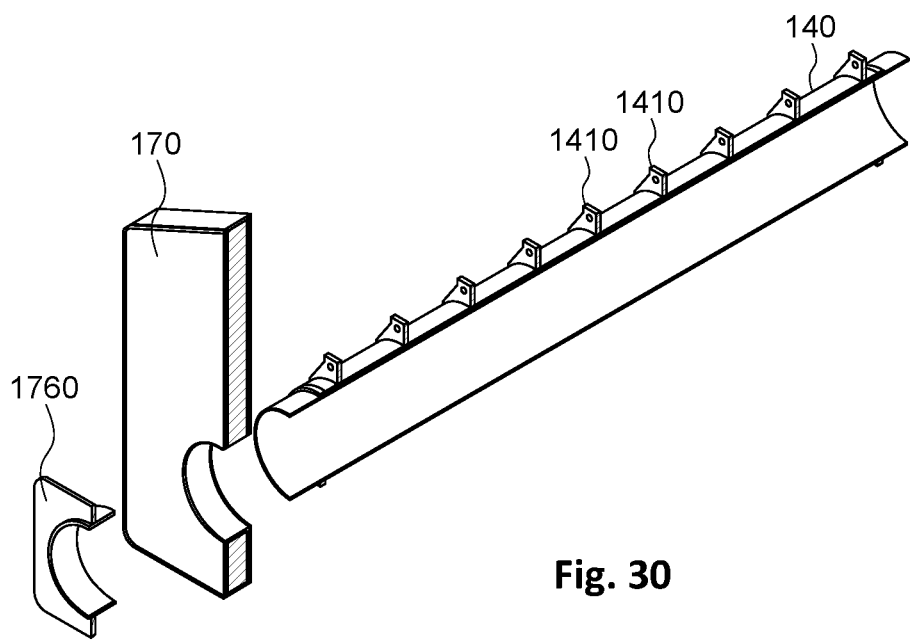
FIG. 30 is an exploded view of the connection between the support beam and the side panel.
Figure 31:
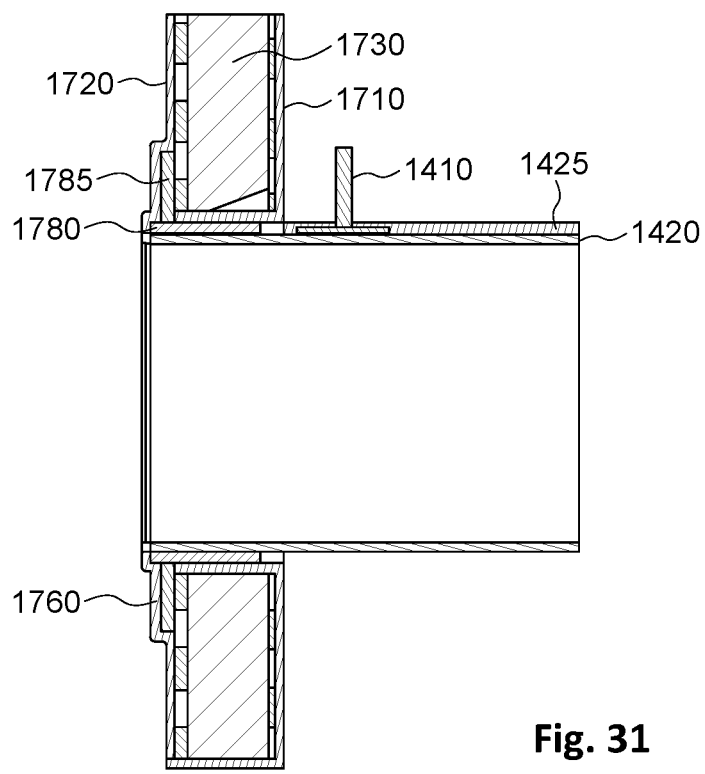
FIG. 31 is a partial close up cross-sectional view of the connection between the support beam and the side panel.
Figure 32:
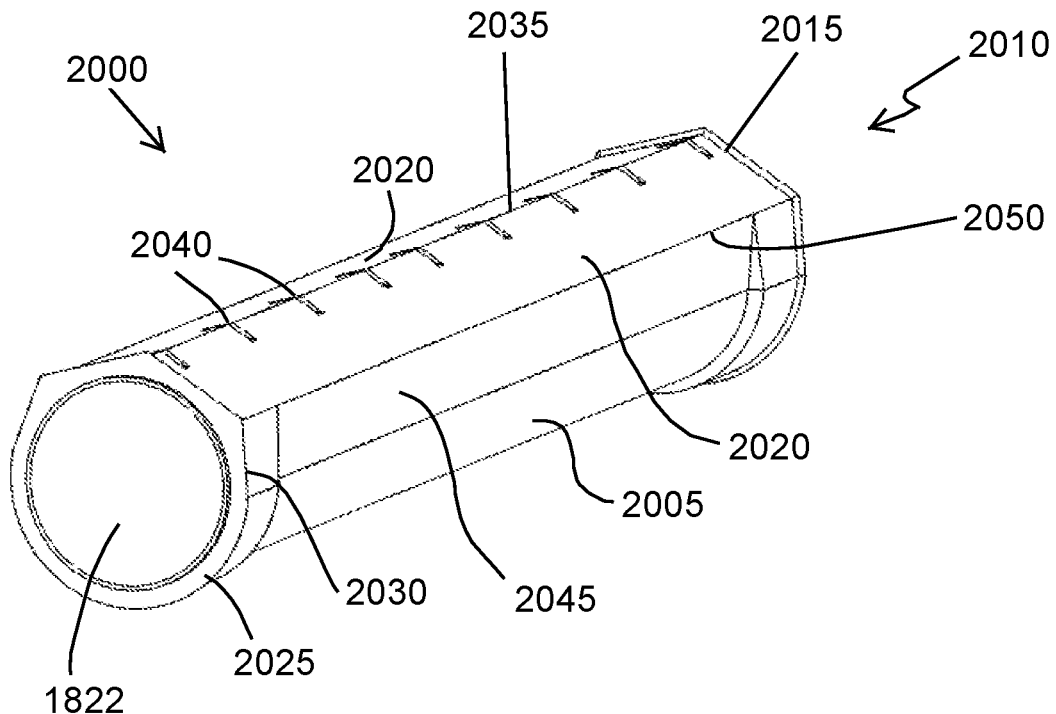
FIG. 32 is a first perspective view of a support beam according to another embodiment of the invention comprising an integrally formed protective cover.
Figure 33:
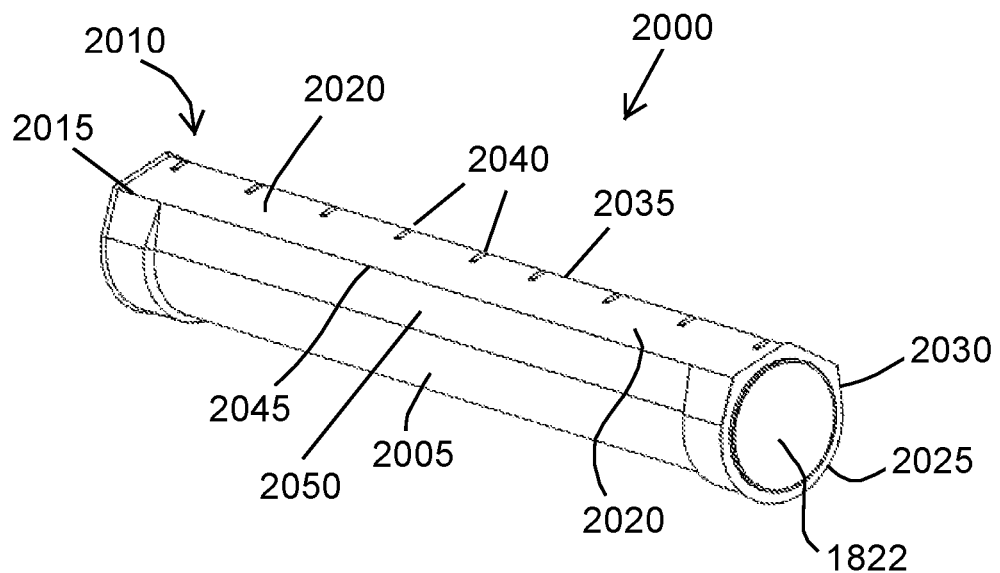
FIG. 33 is a second perspective view of the support beam of FIG. 32.
Figure 34:
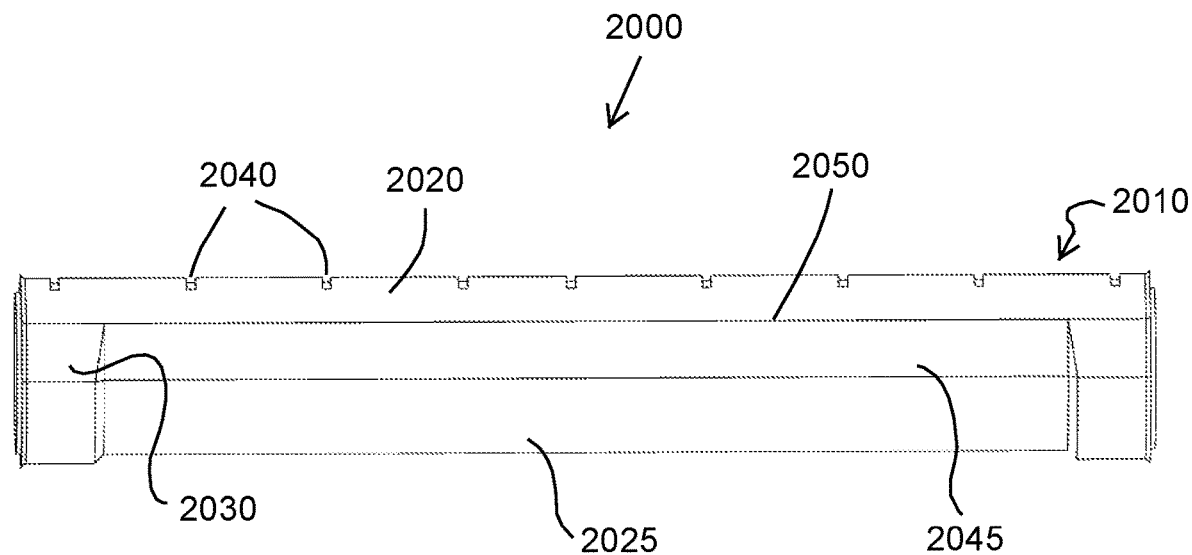
FIG. 34 is a side view of the support beam of FIG. 32.
Figure 35:
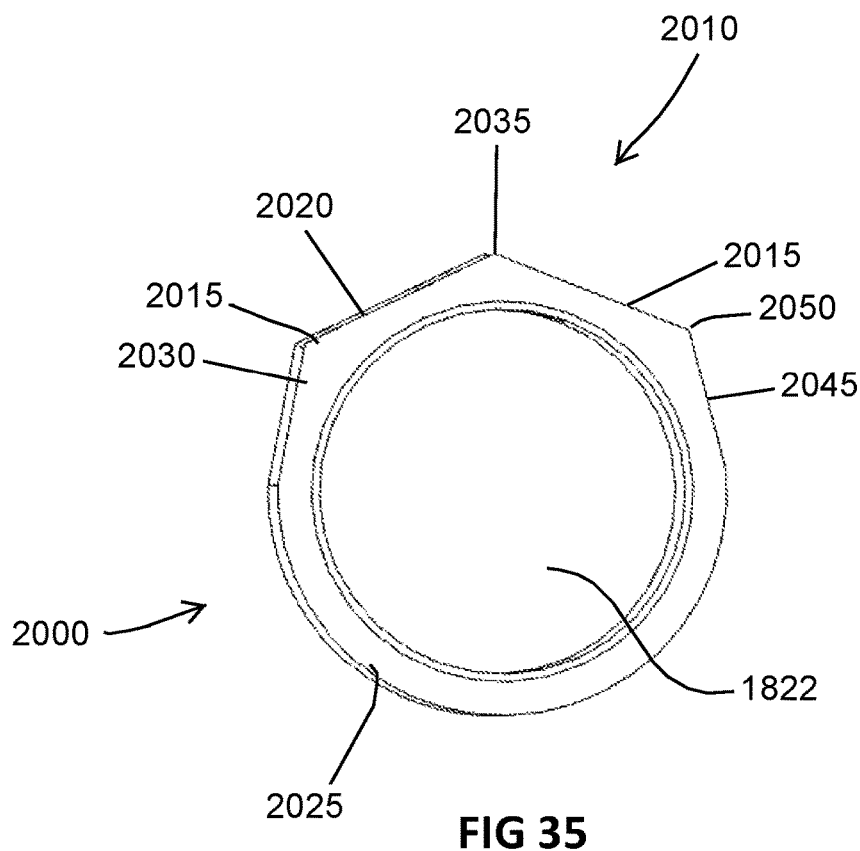
FIG. 35 is an end view of the support beam of FIG. 32.

Referring to FIGS. 30 and 31, the support beam 140 is installed in the vibratory screen 100 by initially inserting a mounting hub 1760 comprising a cylindrical receiving portion 1780 and a plate portion 1785 into holes or openings 1765 formed in the side panel 170, which is formed from an inner carbon fibre layer 1710, an outer carbon fibre layer 1720 and a foam core layer 1730. The mounting hub 1760 is then mounted to an outer carbon fibre layer 1720 of the side panel 170 by a suitable adhesive. The support beam 140 is then inserted into the opening 1765 and slides into engagement with the receiving portion 1780. The support beam is then affixed to the receiving portion 1780 of the mounting hub 1760 by a suitable adhesive, such as a thick layer polymer adhesive.

The polyurethane composition of the outer shell 1425 of the support beams 140 minimises the damage caused by impact strikes from mineral ore particles (that have escaped deflection by the protective cover 1800) and supports the inner carbon fibre core 1420 as it flexes to minimise fatigue, as well as being resistant to any corrosive substances in the ore and/or liquid in both dry and wet applications. The carbon fibre layer(s) in the inner carbon fibre core 1420 also provide strength and flexibility, resulting in greater resistance to fatigue, stress and deformation induced by the vibrations that flow throughout the vibratory screen during operation. The increased rigidity and flexibility conferred upon the support beams 140 by its carbon fibre and polyurethane composition makes the vibratory screen 100 more resistant to damage and breakage caused by mechanical resonance, which may especially occur with the reciprocating motion typically involved with vibrations used in these types of screens for the separation of mineral ore particles. This in turn permits a larger operational window or range for the vibratory screen in terms of being able to either process a greater amount of ore particles with a lower rpm or process a lower amount of ore particles with a higher rpm. Accordingly, the support beams 140 are resistant to stress, deformation, wear, abrasion and corrosion and thus have greater longevity than conventional steel or stainless steel beams. This in turn results in increased longevity for the vibratory screen 100.

Overall, the protective cover 1800 forms a hood to protect the support beam 140 by deflecting mineral ore particles and/or liquid away from support beam as they pass through the screen surface 300. The protective cover 1800 also guides the mineral ore particles to collection trays (not shown) underneath the screen deck 120. Hence, in operation of the vibratory screen 100, the mineral ore particles and/or liquid passing through the screen deck 120 strike or hit the protective covers 1800, where they are deflected, guided or otherwise redirected away from the support beams 140 and the interconnecting flanges 1410 by the deflecting surfaces 1820 for collection beneath the screen deck. The ridges or fins 1845 also guide the mineral ore particles and/or liquid to either the inclined deflecting surfaces 1820, while the skirt portions 1850 ensure that the mineral ore particles and/or liquid do not strike the lateral sides of the support beams 140. Consequently, the protective cover 1800 minimises abrasion and wear on the support beams 140 by reducing or eliminating impacts or strikes from mineral ore particles and contact with corrosive liquids as they pass through the screen deck 120. In addition, the interconnecting flanges 1410 are protected, avoiding damage being caused to the connection between the support beams 140 and the rails 310, 320. Where ore particles avoid deflection by the protective cover 1800 and are able to strike or contact the support beams 140, they resist damage, deformation and breakage that may be caused by these vibrations due to the stress-resistance properties conferred by the inner carbon fibre core 1420 and outer polyurethane shell 1425. This increases the longevity of the support beams 140 and interconnecting flanges 1410, reducing the need for constant replacement of worn and/or damaged support beams. This in turn reduces maintenance time, labour and downtime for the vibratory screen 100, saving capital and labour costs, as well as operational and maintenance costs.

In some embodiments, the protective cover 1800 may have different body shapes other than the substantially triangular prismatic body shape of the cover body 1810. For example, the cover body 1810 can be substantially U-shaped or C-shaped or may substantially have other polygonal or part-polygonal shapes, such as circular, oval, square, hexagonal, octagonal, dodecahedral, rectangular shapes. Similarly, while the protective cover body 1810 need only have a top portion and side portions to protect the upper surface of the support beam 140, in other embodiments, the protective cover may have a bottom portion to partly or fully enclose the support beam. Moreover, in further embodiments, the top portion may be integrated with the side portions, such as triangular shape so that the side portions are joined to form an apex of the cover body 1810.

In some embodiments, the protective cover 1800 may be mounted to the support beams 140 instead of being held in place by the weight of the screen deck 120 and the rails 310, 320 and support beams. For example, the cover body 1810 may have a mounting element in the form of a web, plate or flange that is used to mount the cover body 1810 to the support beam 140 or the interconnecting flange 1410. Alternatively or additionally, the protective cover 1800 could be mounted to the rails 310, 320.

Referring to FIGS. 16 to 19, it is also noted that the FEA maps in each figure each show that the stress applied to the support beams 140 range from nil or little to only low levels. For example, there is no or little stress (coloured blue) that occurs in the support beams 140 at the peak (FIG. 15) and bottom (FIG. 16) of the stroke of the exciter 470. Stress in the support beams 140 only slightly increases to a low level when the vibratory screen 100 is operating with mineral ore particles striking and passing through the screen deck (FIG. 18) and with a full load of mineral ore (FIG. 19). In these figures, there are only small areas of low stress (green) on the support beams 140, while the other areas of the support beams 140 remain at no or little stress (blue). As noted above, this stands in contrast to conventional vibratory screens, which the inventors believe are often required to endure stresses up to 38 to 40 MPa and thus suffer greater fatigue during operation. Consequently, the vibratory screen 100 is more robust and resilient to stress, due to the improvements in its construction, especially the support beams 140.

Referring to FIGS. 32 to 35, a support beam 2000 according to another embodiment of the invention is shown, where the protective cover 1800 of FIGS. 20 to 29 has been integrally formed with the support beam 140. Accordingly, the support beam 2000 in this embodiment comprises a beam body 2005 with a protective cover portion 2010 and deflecting elements 2020 for deflecting material away from the support beam. In this embodiment, the support beam 2000 also has the same composition as the support beam 140 described above; i.e. the beam body 2005 has an inner beam core composed of carbon fibre layers bonded together and an outer polymeric shell (which includes the protective cover portion 2010) formed on the outermost carbon fibre layer comprising polyurethane. As such, the beam body 2005 and cover portion 2010 is wear and abrasion resistant, and so the support beam 2000 has the abrasion and corrosion resistance properties of the support beam 140 and protective cover 1800 combined. However, it will be appreciated that the support beam 2000 need not have the same composition as the support beam 140, and may simply comprise an outer polymeric shell with the cover portion 2010, both comprising polyurethane.

The beam body 2005 has a part-circular shape at its lower portion 2025 and a generally triangular or pentagonal shape prismatic at its upper portion 2030. There is also a hollow interior 1822 and the protective cover portion 2010 comprises two angled or inclined sides 2015, which have corresponding angled or inclined outer surfaces 2020 that define the deflecting elements. In other words, the deflecting elements comprise deflecting surfaces 2020 corresponding to the inclined surfaces of the sides 2015.

The protective cover portion 2010 further has a ridge 2035 where the inclined sides 2015 meet, which is interrupted by openings in the form of slots 2040 formed between the deflecting surfaces 2020 to receive the rails 310, 320. The slots 2040 function in the same manner as the slots 1870 in the protective cover 1800, so that the rails may extend through opposed sides 2020 of the protective cover portion 2000. There is a skirt portion 2045 is formed along each edge 2050 of the protective cover portion 2010.

The protective cover portion 2010 of the support beam 2000 functions in substantially same manner as the protective cover 1800, deflecting, guiding or redirecting mineral ore particles and/or liquid away from support beam as they pass through the screen surface 300. The protective cover portion 2010 also guides the mineral ore particles to the collection trays (not shown) underneath the screen deck 120. Similarly, the ridges 2035 guide the mineral ore particles and/or liquid to either the inclined deflecting surfaces 2020 and the skirt portions 2045 protect the lateral sides of the support beams 2000. Consequently, the protective cover portion 2010 minimises abrasion and wear on the support beams 2000 by reducing or eliminating impacts or strikes from mineral ore particles and contact with corrosive liquids as they pass through the screen deck 120. The advantage of this embodiment is that it is no longer necessary to separately mount a protective cover to the support beam 140, reducing installation and maintenance costs.

It should be noted that although the support beams 140, 2000 described above have a generally cylindrical shape, but in other embodiments, the support beams 140, 2000 may have other cross-sectional shapes, including oval, circular, rectangular, square, triangular, hexagonal, octagonal, decagonal, dodecagonal and any other polygonal shape. In addition, the support beams 140, 2000 may be formed as a combination of these polygonal shapes or have partly polygonal shapes, such as those outlined above It will further be appreciated that features in the preferred embodiment of the invention may be omitted without affecting the operation of the described embodiment. For example, the vibratory screen 100 may include one or more of the described improvements, being the protective side plates 200, the laminate structure of the side panels 170, the drive member assembly 130 and the protective cover 1800. That is, the vibratory screen 100 may include only one of these improvements or a combination of some of these improvements, and still achieve greater longevity for the vibratory screen, reduced maintenance, saving in labour and costs and reduced downtime. Similarly, in another example the protective cover 1800 may not have recessed portions 1830 in the deflecting surfaces 1820 or omit the reinforcement rib 1815. Similar omissions or modifications to the features from the described embodiment of the invention can be readily made by one skilled in the art.

It can thus be seen the improvements described by various aspects of the invention results in a vibratory screen that increases its resistance to wear, corrosion, abrasion and breakage, and so increases its longevity. In particular, the vibratory screen 100, especially the protective plates 200, side panels 170, support beams 140, 2000 and protective cover 1800, are composed of materials that resist damage and abrasion, as well as minimising or eliminating galvanic corrosion that may be caused by steel to steel contact with its components. That is, the side panels 170 are composed of carbon fibre with a foam core, the rear panel 160 has an inner polyurethane layer, the supporting beams 140 are also made of carbon fibre and polyurethane, and the protective plate 200 and protective cover 1800 are composed of polyurethane. This means that the stainless steel or steel components of the vibratory screen 100, such as the drive beam assembly 130, rails 310, spring support 1740, the mounting hub 1760 and springs 150, either have minimal contact or are never in contact with another steel component. Hence, there are limited or no locations in the vibratory screen for galvanic corrosion to occur. Similarly, the drive member assembly 130, side panels 170 and support beams 140 are all resistant to stress and deformation forces that occur during operation of the vibratory screen 100, with the drive beam assembly 130 being particularly able to distribute stress and reduce stress concentrations that are likely to cause breakage. In summary, these improvements lead to more robust components that last longer, and so require less frequent replacement of repair, reducing maintenance time and labour to replace or repair those components. As a consequence, there is a saving in costs as there is less frequent replacement or repair of these components and reduces the amount of downtime for the vibratory screen to perform those replacements or repairs. Furthermore, the various described improvements of the invention can be readily implemented to existing vibratory screens, for example, by adapting any necessary connections. In all these respects, the invention represents a practical and commercially significant improvement over the prior art. Also, while the invention has been described with reference to specific examples, it will be appreciated by those skilled in the art that the invention may be embodied in many other forms.

The invention claimed is:

1. A protective cover for a support beam, comprising a cover body and one or more deflecting elements for deflecting material away from the support beam, wherein the cover body comprises one or more top portions disposed at intervals along the length of the cover body, wherein at least one protrusion extends between adjacent top portions to guide mineral particles and/or liquids to the deflecting elements.

2. The protective cover of claim 1, wherein the deflecting elements comprise deflecting surfaces to deflect mineral particles and/or liquids away from the support beam.

3. The protective cover of claim 2, wherein the deflecting surfaces are inclined relative to the support beam.

4. The protective cover of claim 2, wherein at least one deflecting surface is formed on at least one inclined side of the cover body.

5. The protective cover of claim 1, wherein the deflecting elements are provided on an outer side of the cover body.

6. The protective cover of claim 1, further comprising at least one reinforcement element provided on an inner side or surface of the cover body.

7. A support beam for a vibratory screen, comprising the protective cover of claim 1.

8. The support beam of claim 7, comprising a beam body, wherein the protective cover is mounted to the beam body.

9. The support beam of claim 7, comprising a beam body, wherein the protective cover comprises a protective cover portion integrally formed with the beam body.

10. A support beam for a vibratory screen, comprising:
an inner core having at least one carbon fibre layer;
an outer polymeric shell formed on the at least one carbon fibre layer; and
the protective cover of claim 1.

11. The support beam of claim 10, wherein the inner core has multiple carbon fibre layers, and wherein said multiple carbon fibre layers are bonded together.

12. The support beam of claim 10, wherein the support beam has one or more interconnecting elements for interconnecting the support beam to one or more rails.

13. The support beam of claim 12, wherein the one or more interconnecting elements comprise an interconnecting flange connectable to the one or more rails.

14. The support beam of claim 13, wherein the interconnecting flange comprises a mounting portion for mounting to the support beam and a connecting portion extending from the mounting portion.

15. The support beam of claim 12, wherein the one or more interconnecting elements are integrally formed with the support beam.

16. The support beam of claim 12, wherein the one or more interconnecting elements are mounted to the support beam.

17. The support beam of claim 10 comprising a protective cover comprising a cover body and one or more deflecting elements for deflecting material away from the support beam, wherein the protective cover is mounted to the support beam.

18. The support beam of claim 10 comprising a protective cover comprising a cover body and one or more deflecting elements for deflecting material away from the support beam, wherein the protective cover is integrally formed with the support beam.

19. A vibratory screen comprising: a frame;
at least one screen deck connected to the frame; and
one or more support beams connected to the frame for supporting the screen deck, wherein the one or more support beams are in accordance with claim 10.

* * * * *